US012601407B2

(12) United States Patent
Kalimuthu

(10) Patent No.: US 12,601,407 B2
(45) Date of Patent: Apr. 14, 2026

(54) NON-CIRCULAR BODY GATE VALVE WITH SKIRT PLATE HAVING SPACERS AND METHOD

(71) Applicant: Worldwide Oilfield Machine, Inc., Houston, TX (US)

(72) Inventor: Anand Kalimuthu, Houston, TX (US)

( * ) Notice: Subject to any disclaimer, the term of this patent is extended or adjusted under 35 U.S.C. 154(b) by 145 days.

(21) Appl. No.: 17/908,115

(22) PCT Filed: Mar. 21, 2022

(86) PCT No.: PCT/US2022/021133
§ 371 (c)(1),
(2) Date: Sep. 29, 2022

(87) PCT Pub. No.: WO2022/204020
PCT Pub. Date: Sep. 29, 2022

(65) Prior Publication Data
US 2024/0200667 A1      Jun. 20, 2024

Related U.S. Application Data

(63) Continuation-in-part of application No. 16/885,721, filed on May 28, 2020, now Pat. No. 11,435,001.
(Continued)

(51) Int. Cl.
*F16K 3/20*        (2006.01)
*F16K 3/02*        (2006.01)
*F16K 27/04*       (2006.01)

(52) U.S. Cl.
CPC .............. *F16K 3/20* (2013.01); *F16K 3/0227* (2013.01); *F16K 27/044* (2013.01)

(58) Field of Classification Search
CPC ........ F16K 3/0236; F16K 3/314; F16K 29/00; F16K 3/0254; F16K 3/20; F16K 3/0227; F16K 27/044
(Continued)

(56) References Cited

U.S. PATENT DOCUMENTS 2,977,975 A ‡  4/1961  Allen ...................... F16K 29/00
                                                      137/330
2,977,977 A ‡  4/1961  John, V .................. F16K 29/02
                                                      251/328
(Continued)

FOREIGN PATENT DOCUMENTS

CN        102840348       12/2012
EP         0280805    ‡   8/1988
(Continued)

OTHER PUBLICATIONS

PCT Search Report issued Apr. 29, 2021 for PCT/US2021/013059.‡
(Continued)

*Primary Examiner* — John Bastianelli
(74) *Attorney, Agent, or Firm* — Kenneth L. Nash; Thomas D. Nash

(57)        ABSTRACT

The present invention discloses a gate valve with an upper side and lower side relative the throughbore whereby the lower side is defined by a non-circular outer body. A circular body cavity is on the upper side and a rectangular body cavity is the lower side and a portion of the first side whereby the gate is operable to move up and down within the body cavities. A skirt assembly having spacers is used which is inserted over the gate to cover the gate opening when the gate is moved to the closed position to limit debris and other contaminants from entering the body cavity. The valve may be used with manual, hydraulic, failsafe operators that are interchangeably mountable to the same gate valve without otherwise changing the gate valve.

28 Claims, 13 Drawing Sheets

Related U.S. Application Data

(60) Provisional application No. 63/190,544, filed on May 19, 2021, provisional application No. 63/165,966, filed on Mar. 25, 2021, provisional application No. 62/981,165, filed on Feb. 25, 2020, provisional application No. 62/961,452, filed on Jan. 15, 2020.

(58) Field of Classification Search
USPC .............. 251/326–329; 137/238, 242–245.5
See application file for complete search history.

(56) References Cited

U.S. PATENT DOCUMENTS

| | | | | |
|---|---|---|---|---|
| 2,991,042 A ‡ | 7/1961 | Natho | ................... | F16K 3/0254 251/291 |
| 3,244,399 A ‡ | 4/1966 | Jones | ................... | F16K 31/143 251/327 |
| 3,378,224 A ‡ | 4/1968 | Boyle | ................... | F16K 31/143 251/327 |
| 3,379,405 A ‡ | 4/1968 | Natho | ................ | F16K 31/1221 251/327 |
| 3,466,001 A ‡ | 9/1969 | Nelson | ................... | E21B 41/02 251/327 |
| 3,572,032 A ‡ | 3/1971 | Terry | ..................... | B63C 11/52 60/431 |
| 3,765,642 A ‡ | 10/1973 | Nelson | ................. | F16K 31/143 251/327 |
| 3,842,854 A ‡ | 10/1974 | Wicke | ................... | F16K 17/383 251/14 |
| 3,889,922 A ‡ | 6/1975 | Peters | ................... | F16K 31/143 137/553 |
| 3,913,883 A ‡ | 10/1975 | Irwin | ..................... | E21B 34/04 251/25 |
| 4,081,027 A ‡ | 3/1978 | Nguyen | ................. | E21B 29/08 72/464 |
| 4,212,355 A ‡ | 7/1980 | Reardon | ................ | E21B 34/12 166/336 |
| 4,213,480 A ‡ | 7/1980 | Orum | ................... | F16K 31/143 251/14 |
| 4,215,749 A ‡ | 8/1980 | Dare | ...................... | E21B 29/08 137/68.13 |
| 4,230,299 A ‡ | 10/1980 | Pierce, Jr. | ............ | F16K 43/008 251/282 |
| 4,240,455 A ‡ | 12/1980 | McGee | ................ | F16K 17/383 74/2 |
| 4,281,819 A ‡ | 8/1981 | Linder | ................... | F16K 3/316 251/282 |
| 4,414,995 A ‡ | 11/1983 | Spencer | ................. | F16K 17/38 137/596.18 |
| 4,423,748 A ‡ | 1/1984 | Ellett | ...................... | F16K 31/56 92/130 |
| 4,436,279 A ‡ | 3/1984 | Bonds | ..................... | F16K 3/314 251/86 |
| 4,437,521 A ‡ | 3/1984 | Richardson | ........... | E21B 43/017 166/344 |
| 4,445,424 A ‡ | 5/1984 | Foster | ................. | F16K 31/1223 92/108 |
| 4,590,823 A ‡ | 5/1986 | Neves | ................... | E21B 19/164 81/57.21 |
| 4,612,983 A ‡ | 9/1986 | Karr, Jr. | ................. | E21B 29/04 166/55 |
| 4,619,434 A ‡ | 10/1986 | Snyder | ................. | F16K 17/383 137/75 |
| 4,635,670 A ‡ | 1/1987 | Kilmoyer | ............. | F16K 17/383 137/75 |
| 4,649,704 A ‡ | 3/1987 | Marsh | ................. | E21B 33/0355 92/151 |
| 4,650,151 A ‡ | 3/1987 | McIntyre | ................ | E21B 34/04 251/63.5 |
| 4,668,126 A ‡ | 5/1987 | Burton | ................. | E21B 19/002 166/341 |
| 4,671,312 A ‡ | 6/1987 | Bruton | ................... | E21B 29/04 251/63.6 |
| 4,744,386 A ‡ | 5/1988 | Frazer | ................. | F16K 31/1221 137/315.31 |
| 4,753,292 A ‡ | 6/1988 | Ringgenberg | ........ | E21B 49/001 166/324 |
| 4,771,805 A ‡ | 9/1988 | Maa | ...................... | F16K 3/0236 137/454.6 |
| 4,790,378 A ‡ | 12/1988 | Montgomery | .......... | E21B 34/14 307/118 |
| 4,809,733 A ‡ | 3/1989 | Hawkins | ................ | E21B 34/02 92/60 |
| 4,827,963 A ‡ | 5/1989 | Baker | ................... | F16K 17/383 251/297 |
| 4,830,107 A ‡ | 5/1989 | Rumbaugh | ........... | E21B 49/087 166/264 |
| 4,836,243 A ‡ | 6/1989 | Ferrell | ................ | F16K 31/1221 251/63.6 |
| 4,878,651 A ‡ | 11/1989 | Meyer, Jr. | ............. | F16K 3/0236 251/328 |
| 4,886,115 A ‡ | 12/1989 | Leggett | ................. | E21B 33/072 166/217 |
| 4,921,207 A ‡ | 5/1990 | Baker | ................... | F16K 3/0254 74/25 |
| 4,967,785 A ‡ | 11/1990 | Young | ................. | F16K 31/1221 403/309 |
| 4,997,162 A ‡ | 3/1991 | Baker | ................ | F16K 31/1221 251/327 |
| 5,094,270 A ‡ | 3/1992 | Reimert | ................. | F16K 3/029 137/614.11 |
| 5,269,340 A ‡ | 12/1993 | Drzewiecki | ........... | F16L 41/065 83/745 |
| 5,501,424 A ‡ | 3/1996 | Williams | ................ | E21B 29/04 251/1.3 |
| 5,803,431 A ‡ | 9/1998 | Hoang | ................... | E21B 29/04 251/327 |
| 5,845,708 A ‡ | 12/1998 | Burge | ................... | E21B 19/002 166/77.3 |
| 5,894,771 A ‡ | 4/1999 | Braun | ................... | B23D 21/04 82/47 |
| 5,938,175 A ‡ | 8/1999 | Young | ................... | F16K 3/0281 251/329 |
| 6,041,804 A ‡ | 3/2000 | Chatufale | ........... | F16K 31/1221 92/13 |
| 6,109,353 A ‡ | 8/2000 | Edwards | .............. | E21B 33/035 166/344 |
| 6,209,650 B1 ‡ | 4/2001 | Ingebrigtsen | ....... | E21B 43/0135 166/368 |
| 6,223,825 B1 ‡ | 5/2001 | Ingebrigtsen | ........... | E21B 34/04 166/368 |
| 6,260,822 B1 ‡ | 7/2001 | Puranik | ................. | F16K 3/0236 251/328 |
| 6,457,370 B1 ‡ | 10/2002 | Okano | ................. | B30B 15/284 73/816 |
| 6,601,650 B2 ‡ | 8/2003 | Sundararajan | ........ | E21B 33/063 166/376 |
| 6,684,897 B2 ‡ | 2/2004 | Sundararajan | ........ | F16K 31/122 137/15.19 |
| 6,966,537 B2 ‡ | 11/2005 | Sundararajan | ........ | F16K 3/0227 251/175 |
| 7,013,970 B2 ‡ | 3/2006 | Collie | ................... | E21B 33/047 166/344 |
| 7,040,408 B2 ‡ | 5/2006 | Sundararajan | ...... | E21B 33/0415 166/368 |
| 7,578,349 B2 ‡ | 8/2009 | Sundararajan | ........ | E21B 33/076 166/344 |
| 7,849,926 B2 ‡ | 12/2010 | Inderberg | .............. | E21B 17/085 137/68.14 |
| 8,091,861 B2 ‡ | 1/2012 | Nesje | ................... | F16K 3/0227 251/282 |
| 9,453,578 B2 | 9/2016 | Sundararajan | | |
| 9,732,576 B2 ‡ | 8/2017 | Rao | ..................... | E21B 33/063 |
| 9,885,420 B2 | 2/2018 | Sundararajan | | |
| 10,006,266 B2 ‡ | 6/2018 | Sundararajan | ........ | E21B 33/064 |
| 10,174,848 B2 | 1/2019 | Sundararajan | | |
| 10,677,360 B2 | 6/2020 | Sundararajan | | |
| 10,969,023 B2 | 4/2021 | Mcguire et al. | | |
| 11,028,929 B2 | 6/2021 | Mcguire et al. | | |

(56) References Cited

U.S. PATENT DOCUMENTS

| | | | |
|---|---|---|---|
| 11,125,341 | B2 | 9/2021 | Sundararajan |
| 11,131,393 | B2 | 9/2021 | Sundararajan |
| 11,549,594 | B2 | 1/2023 | Sundararajan |
| 11,644,105 | B2 | 5/2023 | Sundararajan |
| 12,013,046 | B2 | 6/2024 | Sundararajan |
| 2010/0243936 | A1 | 9/2010 | Nesje |
| 2019/0032793 | A1 ‡ | 1/2019 | Lah ..................... F16K 3/0236 |
| 2023/0228332 | A1 | 7/2023 | Sundararajan |
| 2023/0272860 | A1 | 8/2023 | Sundararajan |

FOREIGN PATENT DOCUMENTS

| | | | |
|---|---|---|---|
| EP | 2976559 | | 1/2016 |
| EP | 3292329 | | 3/2018 |
| EP | 3670977 | | 6/2020 |
| EP | 21158788 | | 10/2021 |
| EP | 21212915 | | 4/2022 |
| GB | 1464452 | ‡ | 2/1977 |
| JP | 2014142001 | ‡ | 8/2014 |
| KR | 10-2014-010086 | | 8/2014 |
| RU | 2594450 | ‡ | 8/2016 |
| WO | WO 2017-100066 | | 6/2017 |

OTHER PUBLICATIONS

Written Opinion of the International Preliminary Examining Authority, PCT/US2021/013059, Nov. 24, 2021.‡
International Search Report for PCT/US2022/021133 issued Jul. 5, 2022.

‡ imported from a related application

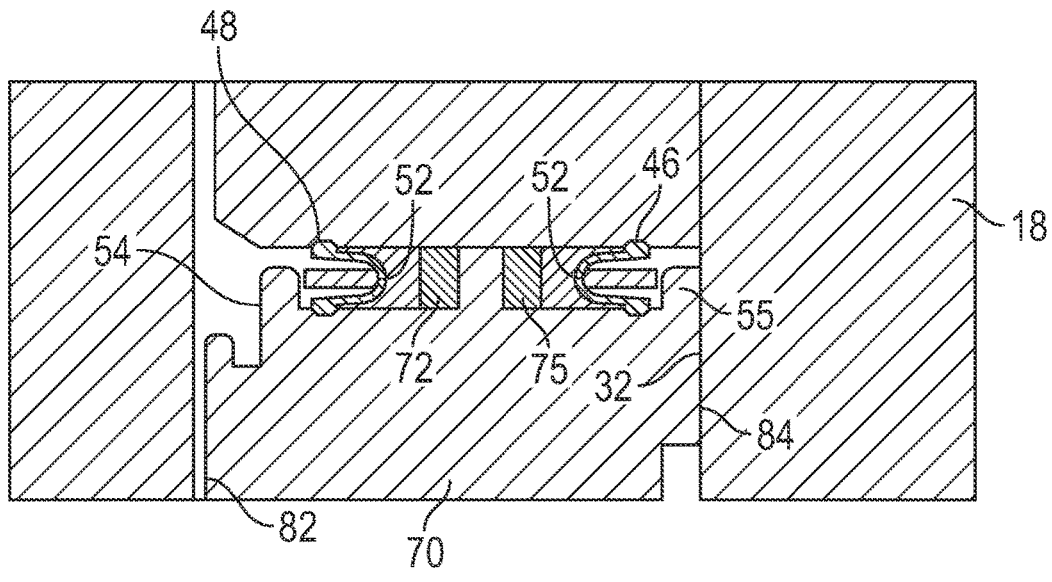
FIG. 8
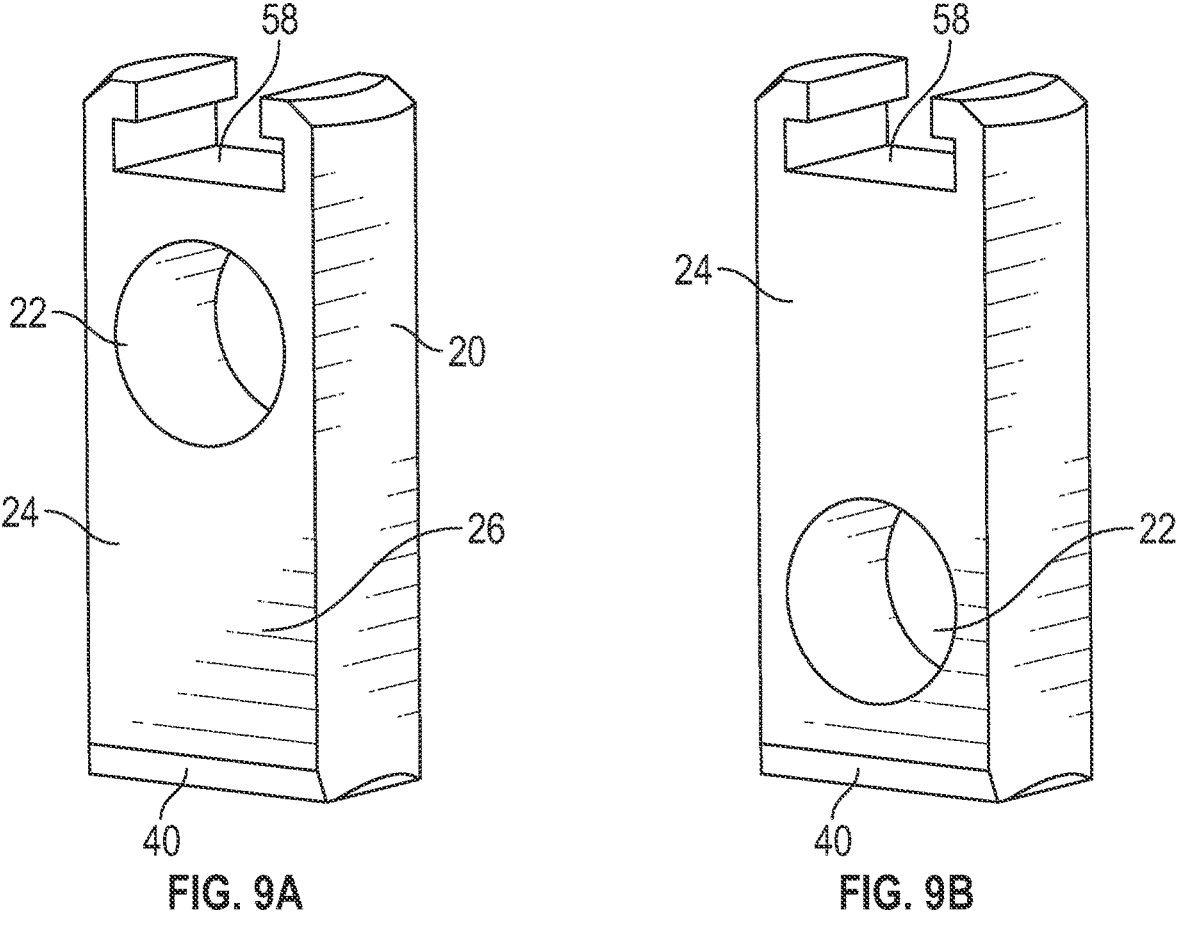
FIG. 9A                    FIG. 9B

NON-CIRCULAR BODY GATE VALVE WITH SKIRT PLATE HAVING SPACERS AND METHOD

BACKGROUND

The present invention relates generally to valve assemblies and, more particularly, to an improved gate valve assembly.

Gate valves are used in the oilfield and have an internal sliding gate that controls fluid flow through the throughbore of the gate valve. The sliding gate is flat with an opening side and a blank sealing side. When the opening side of the gate is aligned with the throughbore then fluid is able to flow through the gate valve. When the blank sealing side of the gate is aligned with the wellbore, then fluid is prevented from flowing through the gate valve.

SUMMARY OF THE INVENTION

An objective of the present invention is to provide an improved gate valve assembly.

Another objective of the present invention is to provide a gate valve assembly with a body cavity that is at least partially rectangular and thereby having a non-circular body, such as for example an oval body, to thereby significantly reduce the amount of metal required and thereby reduce weight of the valve body. The seats and gate can also be slimmer than would be the case if the body cavity were round to even further reduce the weight.

Yet another object of the present invention is to provide a body cavity with a circular cavity on a first side and a rectangular cavity on the second side.

Another object of the present invention is to provide reduced sized seats for the gate valve assembly.

Still another object of the present invention is to provide bidirectional seals on the seats to assist sealing fluid flow within the well.

Yet another object of the present invention is to provide a skirt assembly with spacers that engage the body cavity wall to prevent contaminants from entering the body cavity to ensure reliable operations of the gate valve.

Yet another object of the present invention is to provide a gate valve with a lower body portion surrounding a rectangular body cavity having a smaller, non-circular outer diameter.

Yet another object of the present invention is to provide seals that operate in all ranges of temperature, pressure, and types of fluid that are encountered in oilfield applications.

While gate valves are much lighter than BOPs, another object would be to reduce the weight and size of the gate valve for the same size throughbore without sacrificing function. It would be desirable to reduce the number of parts and make the same size gate valve usable in many different applications.

In some cases, it is not known where the gate valve will be used or where it may be moved making selection of the proper seals problematic. Yet another object would be to be able to use the same gate valve for a desired throughbore size for all ranges of temperature, pressure, and types of fluid that are encountered in oilfield applications.

Another object is to have a gate valve that is bidirectional and has upstream sealing with downstream back up seals. However, it is also a possible object that the gate valve is convertible to downstream only sealing by simply removing one or more seals because some users prefer to have only downstream sealing gate valves.

These and other objectives, features, and advantages of the present invention will become apparent from the drawings, the descriptions given herein, and the appended claims. However, it will be understood that above-listed objectives and/or advantages of the invention are intended only as an aid in understanding aspects of the invention, are not intended to limit the invention in any way, and therefore do not form a comprehensive or restrictive list of objectives, and/or features, and/or advantages.

One general aspect includes a gate valve. The gate valve comprises a throughbore in the gate valve that extends through the gate valve. The gate valve may include an upper body segment and a lower body segment. The lower body segment may have a non-circular outer circumference that is smaller in diameter than a diameter of the outer circumference of the upper body segment. The valve also includes a body cavity in the gate valve that is oriented transversely to the throughbore. The valve also includes a gate movable in the body cavity between an open position and a closed position. The body cavity in the gate valve extends from above the throughbore to below the throughbore when the gate valve is upright. The gate has a gate opening that aligns with the throughbore in the open position. The gate has a blank portion that aligns with the throughbore in the closed position. The valve also includes a plate mounted in the body cavity on each side of the gate so that the gate is moveable with respect to each plate. Each plate may include a plurality of spacers that extend from each plate to engage a wall of the body cavity. Each plate is sized and positioned to cover the gate opening when the gate is moved to the closed position. Each plate is positioned to limit debris movement between the gate opening and the body cavity. The gate is mounted so that when the gate valve is upright and in the closed position then the gate opening is above the throughbore as shown in FIG. 1.

Implementations may include one or more of the following features. When the gate valve is upright, e.g. FIG. 1, then the body cavity above the throughbore may include a round cross-section portion and a non-circular portion. The body cavity below the throughbore may include a second non-circular cross-section, where the second non-circular cross-section is sized to slidingly receive the gate. The gate valve may include a top plate that connects to each plate. The top plate may include an opening therein. The stem-gate connection may include a latch without threads. The stem or the stem-gate connection extends through the opening in the top plate. The gate valve may include a seat on both sides of the gate. Each seat may include an opening therethrough and is therefore in surrounding relationship to the throughbore. Each seat may include a gate engagement end that engages one side of the gate. The plates are mounted on each side of the gate. The plates may include an end that engages a corresponding seat to support each plate within the body cavity. The gate valve is operable with hydraulic, failsafe, and/or manual operators that are interchangeably mountable to the gate valve. The gate valve may have an outer circumference of the lower body segment that is non-circular. For example, the outer circumference of the lower body segment may be oval. Each plate may be mounted to the top plate with an inward bend that is slightly less than 90 degrees. Once inserted the plate produces pressure against the gate due to the inward bend.

The gate valve may include an upper body segment and a lower body segment when the gate valve is upright and the lower body segment may include an outer circumference that is non-circular—in other words an outermost cross-sectional line that is non-circular. The valve also includes a body cavity in the gate valve that is oriented transversely to the throughbore. The valve also includes a gate movable in the body cavity between an open position and a closed position. The body cavity in the gate valve extends from above the throughbore to below the throughbore when the gate valve is upright. The gate has a gate opening that aligns with the throughbore in the open position. The gate has a blank portion that aligns with the throughbore in the closed position.

When the gate valve is upright or in an operating position as shown in several drawings, then the body cavity above the throughbore may include a round cross-section portion and a non-circular portion. The body cavity below the throughbore may include a second non-circular cross-section, where the second non-circular cross-section is sized to slidingly receive the gate. The gate valve may include a plate mounted in the body cavity on each side of the gate so that the gate is moveable with respect to each plate. Each plate may include a plurality of spacers that extend from each the plate to engage a wall of the body cavity. Each plate is sized and positioned to cover the gate opening when the gate is moved to the closed position. Each plate is positioned to limit debris movement between the gate opening and the body cavity. The gate is mounted so that when the gate valve is upright and in the closed position then the gate opening is above the throughbore. The gate valve has a seat on both sides of the gate. Each seat includes an opening therethrough and is in surrounding relationship to the throughbore. Each seat has a gate engagement end that engages one side of the gate. Each plate has an end that engages a corresponding seat to support each plate within the body cavity. The stem-gate connection may include a latch without threads. The gate valve may include a top plate that connects to each plate. The top plate may include an opening therein. The stem or the stem-gate connection extends through the opening in the top plate. The gate valve is operable with a hydraulic, failsafe, and/or manual operator that are interchangeably mountable to the gate valve. The outer circumference of the lower body segment is oval.

When the gate valve is upright then the body cavity above the throughbore may include a round cross-section portion and a non-circular portion. The body cavity below the throughbore may include a second non-circular cross-section, where the second non-circular cross-section is sized to slidingly receive the gate. The gate valve may include a plate mounted in the body cavity on each side of the gate so that the gate is moveable with respect to each of the plates.

BRIEF DESCRIPTION OF THE DRAWINGS

The following detailed description and claims are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 8 is a side view of another possible seal assembly on one seat of a gate valve in accord with one embodiment of the present invention.

FIG. 9A is a perspective view of a T-slot connector gate that slidingly fits onto a T-shaped stem connector for a gate valve in accord with one embodiment of the present invention.

FIG. 9B is a perspective view of another embodiment of a T-slot connector gate that slidingly fits onto a T-shaped stem connector for a gate valve in accord with one embodiment of the present invention.

DETAILED DESCRIPTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
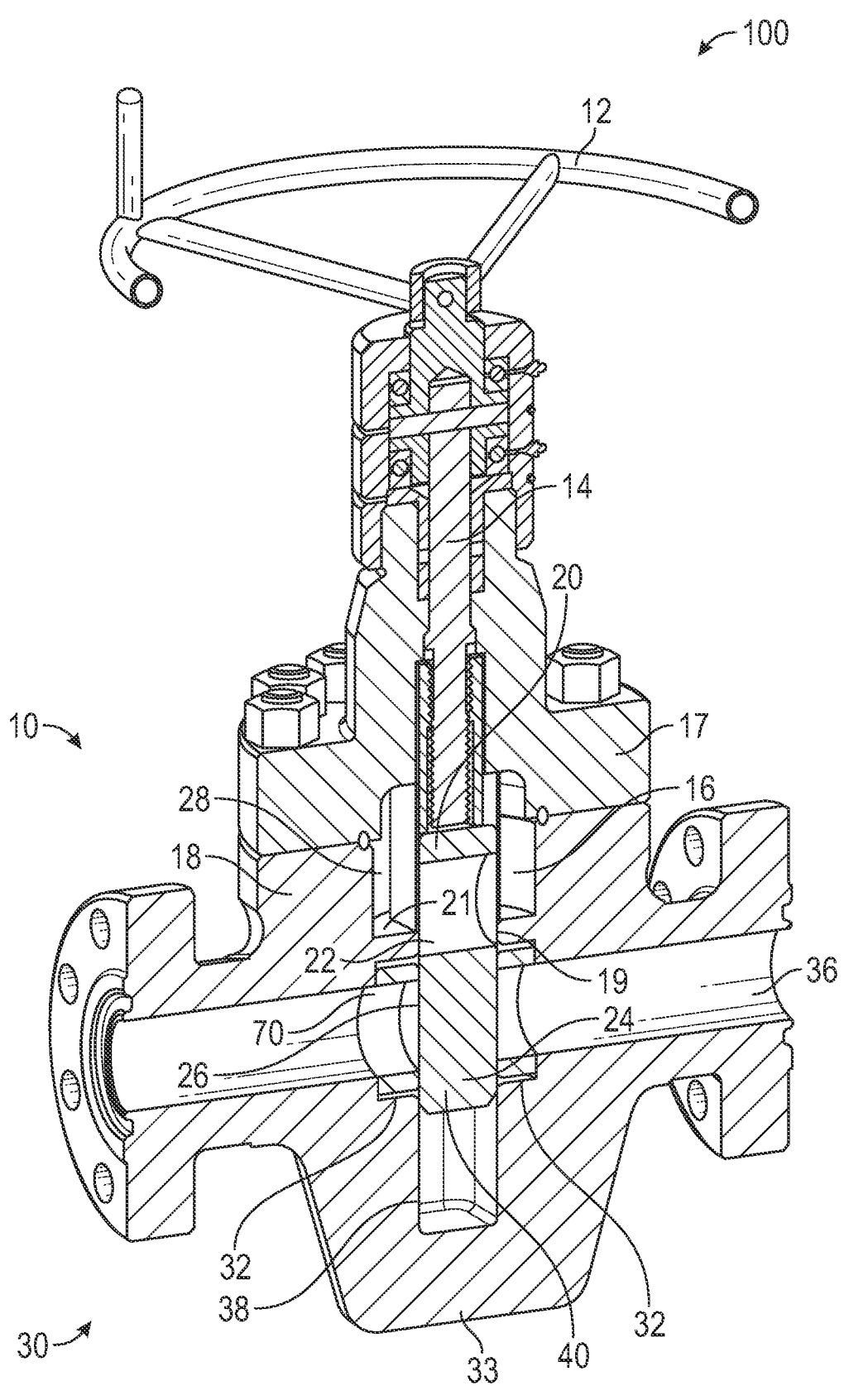
FIG. 1 is a perspective view of a gate valve with a rectangular lower body cavity and a round upper body cavity in accord with one embodiment of the present invention.
Figure 2:
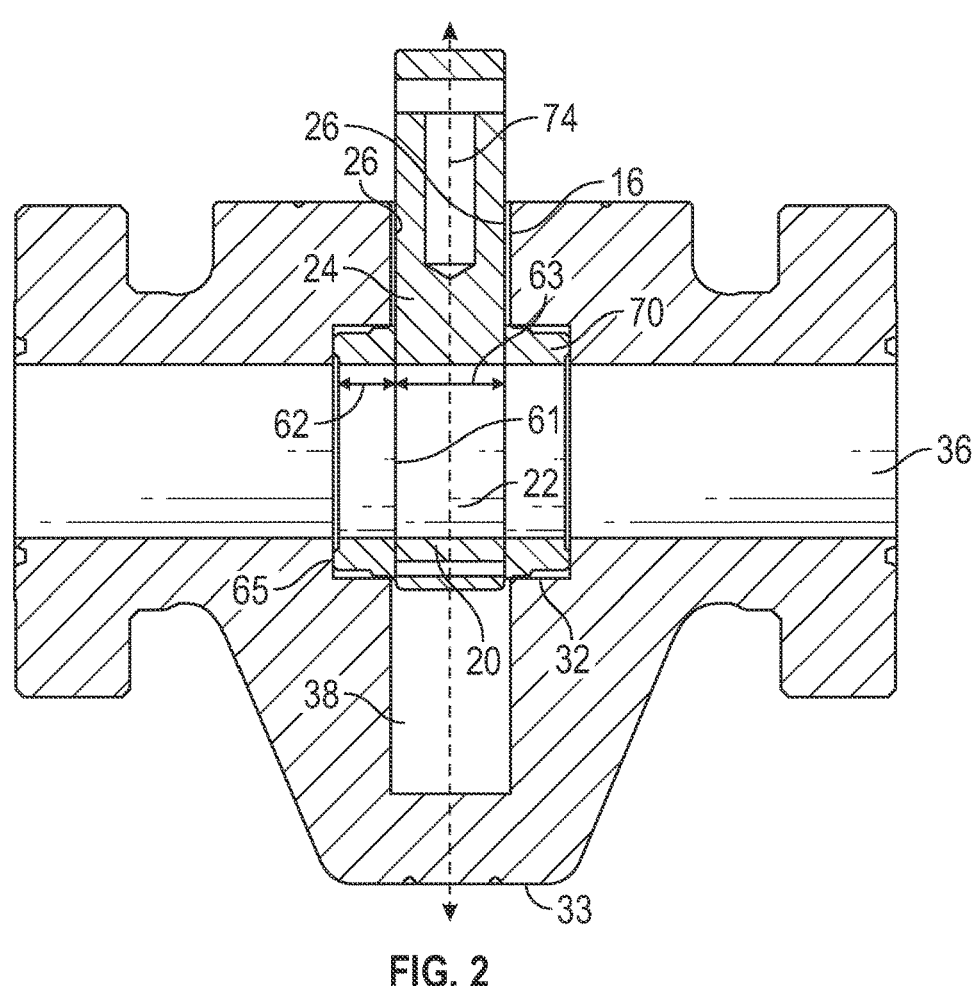
FIG. 2 is a side elevational view of a gate valve without the bonnet and showing a rectangular body cavity without a round body cavity in accord with one embodiment of the present invention.

Referring now to the drawings, and more particularly to FIG. 1, a gate valve 100 is shown with a non-circular or in this embodiment an oval valve body 18. Internal to valve body 18 is a body cavity 16 which may comprise a round cross-section upper body cavity 28 and a rectangular or non-circular cross-section for lower body cavity 38. When the valve is upright as shown, then the round upper body cavity 28 is above throughbore 36. Rectangular inner cross-section lower body cavity is below throughbore 36. Throughbore 36, also round, extends through the gate valve 100 to intersect the body cavity 16 and is preferably perpendicular thereto as shown. Bonnet 17, which is bolted to the top of the valve body 18, may also define a portion of round upper body cavity 28. A floor 21 is the bottom of the round body cavity 28 and the beginning of lower rectangular body cavity 38 and includes a rectangular throat portion 19 of that extends inwardly from round upper body cavity walls 16 above throughbore 36. Throat portion 19 comprises flat or non-circular sides. In other words, just above throughbore 36, there is a first rectangular or non-round cross-section portion of the body cavity. However, from floor 21 upwards as shown in the drawing, the body cavity 28 is round. While the entire upper body cavity 28 could be rectangular as shown in FIG. 2, it has been found advantageous that upper body cavity 28 is round to enable filling with grease as discussed hereinafter. If rounded, the upper body cavity 28 may be either circular, elliptical, or some other configuration with rounded walls.

Seats 70 comprise an opening that is effectively part of throughbore 36. Accordingly, the seats 70 are in surrounding relationship to the throughbore 36. The gate 20 comprises flat sides 26 which are in contact with the body cavity 16 and seats 70 with the blank portion of the gate positioned to block flow through the throughbore 36. In other words, the blank portion is aligned with the throughbore 36 to prevent fluid flow therethrough. In this embodiment, the gate 20 has an opening 22 on the upper portion of the gate. The opening 22 when aligned with the throughbore 36 is the open position of the gate valve 100 and allows fluid flow through the throughbore 36. The blank sealing surface 26 is on the opposite side of the gate 20 from the opening 22 and blocks fluid flow to seal the throughbore 36 when blank surface 26 is aligned with the throughbore 36.

Gate 20 is provided with a round opening 22 the same size as throughbore 36 which allows fluid flow through the gate in an open position and stops fluid flow when in the closed position. In a preferred embodiment, this opening is located in an upper portion of the gate 20, when the gate is oriented upright as shown in the figures. One benefit of having the opening 22 at the top of the throughbore is the use of skirt 60 that reduces the amount of debris that enters body cavity 16. See FIGS. 11-12, 14A-D that show skirt 60 surrounding the gate 20 in sliding engagement with the gate that prevents debris from collecting in or moving around the body cavity 16 during movement between the open to the closed position. Another practical benefit of having the opening at the top allows simplification across all gate valve sizes with reduced numbers of different parts required.

Seats 70 are positioned between the gate 20 and the valve body 18 on both sides of the gate 20. The gate engages the metal seats 70 to provide a metal to metal seal with the seats. The metal to metal seal between gate 20 and seats 70 operates over the wide range of temperature, pressure, and types of fluids that are encountered in oilfield operations. Leakage around seats 70 between the seats and the valve body 18 in pockets 32 is discussed hereinafter.

Gate valve 100 may be operated manually by use of a handle 12 which is rotated. However, a powered operator may also be utilized. In this case, handle 12 is connected to a valve stem 14 which rotates to raise or lower gate 20.

In more detail and continuing the discussion above, the body cavity 16 may be divided into two portions, an upper round or circular cavity side 28 above floor 21 and a lower rectangular cavity side 38 below floor 21. The upper body cavity 28 may have a circular cross-section, oval cross-section, elliptical cross-section or the like. While an oval cross-section may reduce the body size, number of bolts, and the like to maximize weight/size reduction, it may be easier to manufacture using a circular cross-section body cavity. In this preferred embodiment, lower valve body 33 defines therein rectangular cavity 38. Lower valve body 33 also comprises an outer circumference with an oval shape as shown in several drawings, e.g. FIG. 13. In other embodiments, other non-circular shapes of the outer circumference of lower valve body 33 may be utilized consistent with the teachings herein. Lower valve body 33 may also be referred to as a lower body segment.

An advantage of a round cross-section in upper body cavity 28 over a rectangular cross-section is that upper body cavity 28 may be better packed with grease or other suitable lubricants to ease movement and sealing of the gate within the cavity. It will be appreciated that due to the larger size of the upper circular body cavity 28 as compared to a rectangular upper body cavity, more grease may be utilized, which provides more lubrication and blocks debris from the fluid flow through throughbore 36. During opening and closing of the gate debris can make its way into the body cavity 16 due to accumulation in gate opening 22.

Figure 3:
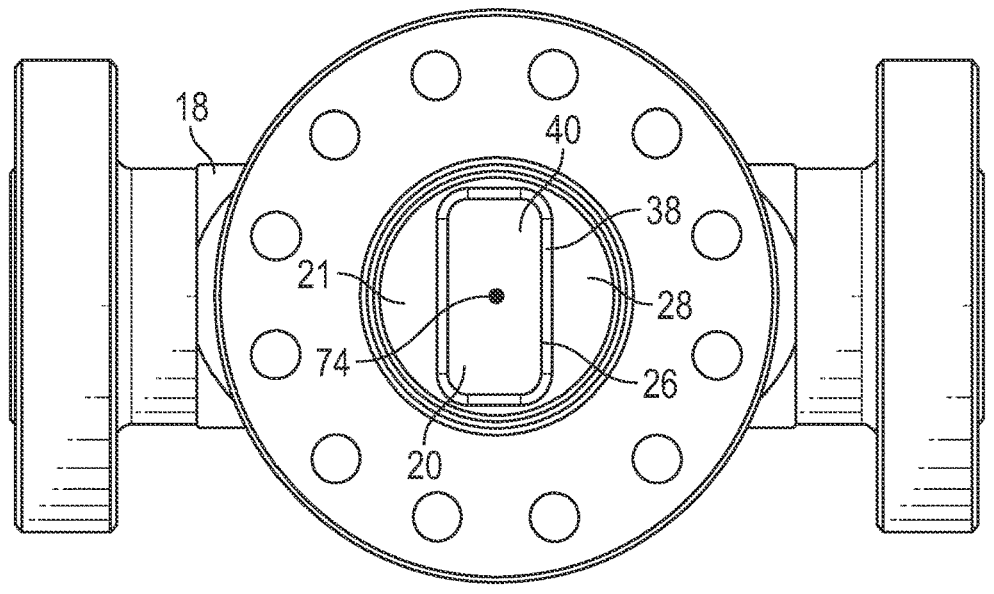
FIG. 3 is a top view looking down the body cavity through a circular upper body cavity to a lower rectangular body cavity comprising at least two flat walls and actually four flat walls and rounded corners in the shown embodiment for a gate valve assembly in accord with one embodiment of the present invention.

The gate 20 has a rectangular cross-section that fits snugly within the rectangular cross-section of lower body cavity 38. A view of the rectangular cross-section of the lower body cavity 38 is visible looking down into the valve (with the bonnet removed) from the top as shown in FIG. 3. A rectangular cross-section body cavity 38 which may also be referred to as a second rectangular cross-section portion, reduces the amount of material needed to construct the gate valve for the given size throughbore 36 and thereby reduces the weight. Another advantage of the rectangular body cavity is that it reduces the seat width 62 (see FIG. 2) required for the seats 70 because they do not have to be wide enough to extend through the radius of a circular body cavity before reaching the pocket 32 into which the seats 70 fit. This can also allow for a narrower gate 20 as suggested by a cross-section hereinafter referred to as narrower gate or reference number 63.

Lower side 30 of the gate valve comprises the rectangular body cavity 38 defined by oval lower valve body 33. As explained above, the use of a rectangular body cavity allows for the smaller seat width 62 (and weight) seats to be utilized and for a narrower gate, as well as allowing a smaller overall diameter of lower valve body 33. The seats may have a reduced seat width 62 (FIG. 2) extending outward from the gate and compared to the gate width 63 (FIG. 2). This in turn reduces the amount of materials needed, the costs required for construction, and reduces the overall weight of the gate valve.

Turning to FIG. 2, a side elevational view of gate valve 100 is shown in accord with one embodiment of the present invention. An axis 74 extends through the body cavity 16 is perpendicular to throughbore 36 and bisects body cavity 16. During opening and closing operation, gate 20 moves axially along axis 74. Axis 74 also bisects gate 20. In FIG. 2, gate 20 is axially positioned such that opening 22 is aligned with throughbore 36 thereby allowing fluid to flow through throughbore 36.

The seat width 62 is the distance between the sealing end 61 and the outer end 65 of each seat. In prior art systems, a rounded cavity is commonly used with the flat gate which in turn requires wider seats. In one embodiment, the gate width 63 between the two flat sealing sides 26 of gate 20 is greater than the seat width 62 between said sealing end 61 and the outer end 65 of each seat. Accordingly, the use of a rectangular body cavity with oval lower body provides the advantage of decreasing the amount of material necessary to make the enlarged size of a rounded body cavity, reducing weight, and size of the valve for the same size throughbore 36 and pressure rating of the gate valve. The weight of valve body 18 may be reduced by approximately 32% in this manner. In other possible embodiments, the amount of weight reduced may be more or less than 32% as well.

As one example, a prior art round body cavity required a seat width of approx. 5.5 inches and a gate width of 4.5 inches for a valve with throughbore 36 diameter of $3\frac{1}{16}$ inches and 15K pressure rating. In the new design for the same size throughbore 36 with a rectangular body cavity, the gate could have a thickness 63 of 2.62 inches and the seat a thickness 62 of 1.6 inches. In this example, the seat width is 62% of the gate width. Accordingly, the seat width is less than 100%, or less than 90%, or less than 80%, or less than 70%, or could be any percentage in this range, of the gate width. This saves not only the weight of the body but also reduces the weight of the gate and seat considerably. The gate has a thickness 63 less than the diameter of throughbore 36 and in this example is 85% of the throughbore or less than 90% of the throughbore.

FIG. 3 shows a top view of a gate valve body 18 for a gate valve assembly 100 looking down into body cavity 16 in accord with one embodiment of the present invention. The circular body cavity 28 is formed within an upper portion of body 18 and the bonnet. The circular body cavity 28 may bottom at floor 21. Gate 20 is located within circular cavity 28 and rectangular body cavity 38. Gate 20 is rectangular with a rectangular cross section 40 perpendicular to axis 74. Gate 20 is comprised of flat sealing sides 26 that engage the seats (see FIGS. 1 and 2). The rectangular gate 20 fits snugly into the rectangular body cavity 38 so as to be guided by the four flat walls of rectangular body cavity 38. The circular cavity 28 may also be packed with grease or other suitable lubricants allowing for smoother operation, minimized debris from the fluid that gets trapped in the gate opening when the gate moves to the closed position, and less wear during movement of the gate between the open or closed positions. As noted above, having the upper body cavity being round allows for a greater volume of grease than if the body cavity were also rectangular at the top of the valve. However, having a rectangular body cavity at the top of the valve would also be a possible design in accord with the present invention.

Figure 4:
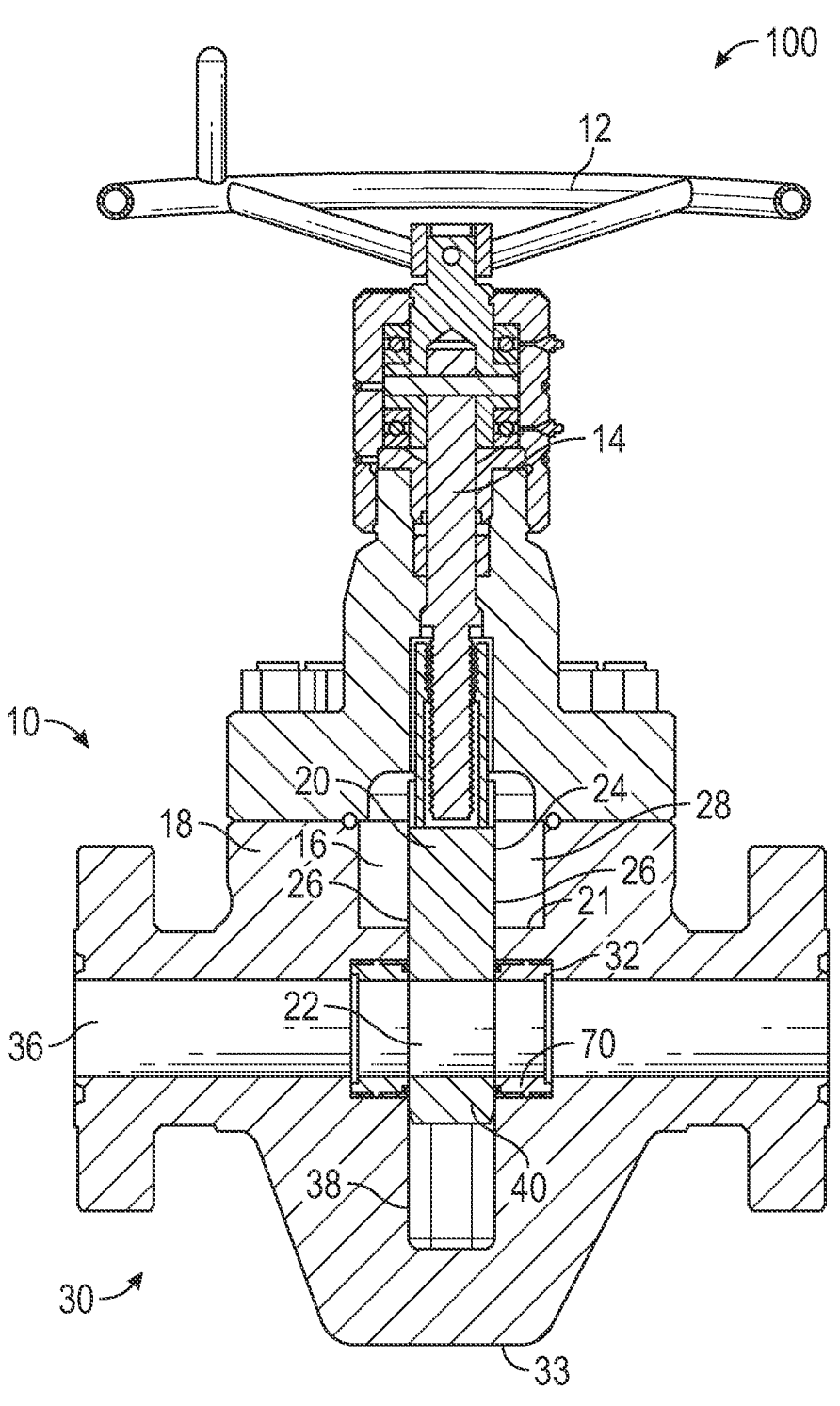
FIG. 4 is a side sectional view of a gate valve assembly showing slimmer seats on the side of the gate within the rectangular body cavity than is possible with a round body cavity in accord with one embodiment of the present invention.

Turning to FIG. 4, a side sectional view of gate valve 100 is shown in accord with one embodiment of the present invention. The body cavity 16 has a lower body cavity portion or rectangular body cavity 38 which is rectangular shaped below the throughbore 36 on a second or lower side 30 of the gate valve. An upper body cavity portion of body cavity 16 comprises circular cavity 28 above floor 21 on a first or upper side 10 of the gate valve. In other embodiments, the upper body cavity portion may be oval or rectangular shaped.

In one embodiment, the lower portion of the body cavity on lower side 30 of the gate valve slidingly receives the rectangular gate 20 when the gate valve 100 is moved into the open position. In another possible embodiment, the gate 20 may have the opening 22 on the lower part of the gate with the blank on the upper side of the gate 20. As shown, the gate 20 is in the open position with opening 22 aligned with throughbore 36 thereby allowing fluid to flow. When desired or necessary, gate 20 may be lowered by turning handle 12 which is connected to stem 14 and further connected to the gate 20. The rectangular gate 20 will then move axially into rectangular cavity 38. It will also be appreciated that the seats 70 have a decreased width. The rectangular body cavity shape brings the seats 70 closer to the gate 20 and eliminates the need for seat retainers, which are used in some prior art gate valves. As discussed before, lower valve body segment 33 is substantially smaller than upper valve body 18, as rectangular valve body cavity 38 is not as large as upper round body cavity 28. This allows construction with less material, quicker production, and overall less manpower to make the invention.

Manual operator 12 may be interchangeable with other operators as illustrated in FIG. 18A-18D. So a plurality of different operators may be utilized on the same body and valve assembly. This is convenient for clients who can then choose any desired operator for the valve. As well, the manufacturer can less expensively provide a valve with the desired operator because all operators work with the same valve. In other words, the manufacturer has less storage costs and fewer parts.

Figure 5:
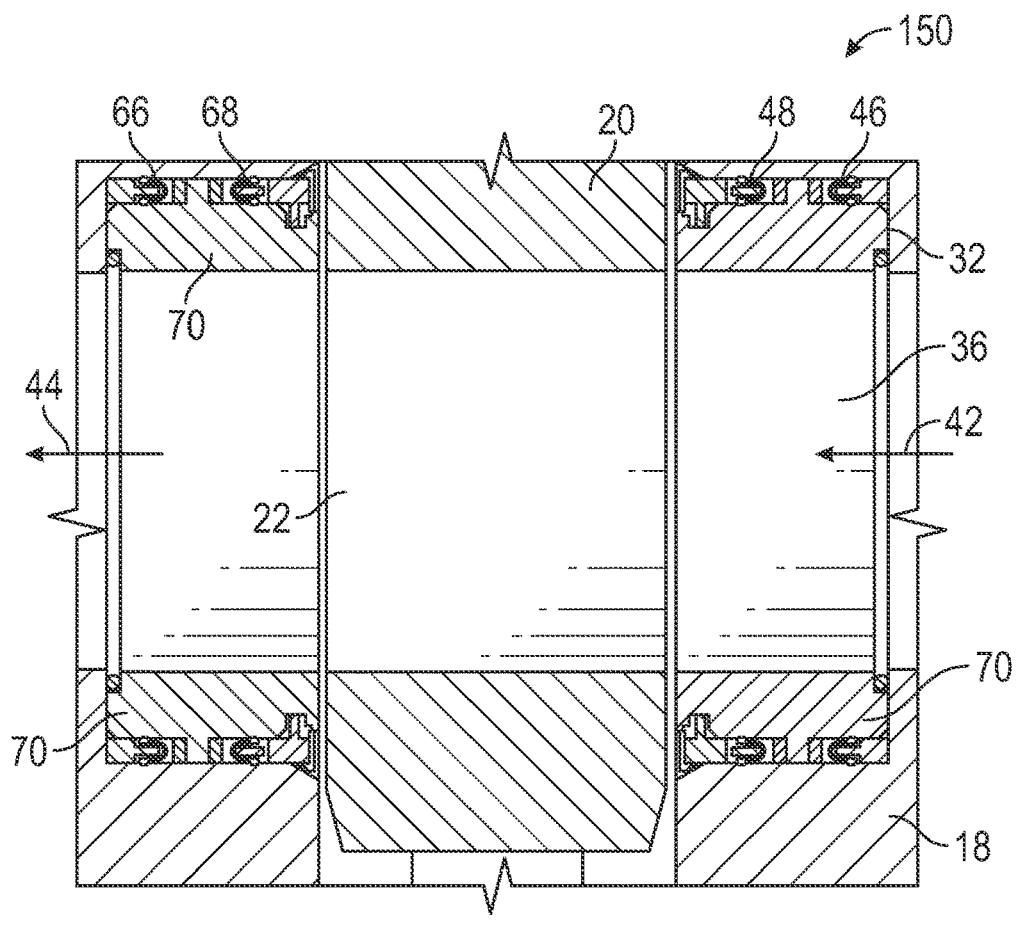
FIG. 5 is a side view of a gate valve showing two seats and seal assemblies on either side of the gate in a rectangular portion of the body cavity in accord with one embodiment of the present invention.

In FIG. 5, a side view of a seat assembly 150 is shown in accord with one embodiment of the present invention. As shown, gate 20 is in the open position with opening 22 aligned with throughbore 36. The seats 70 are mounted in pockets 32 in body 18. The upstream side is indicated by flow arrow 42 while the downstream side is indicated by flow arrow 44. When the gate 20 is moved to the closed position, the fluid flow in throughbore 36 is blocked by the flat sides of blank section 24 of gate 20 (see FIG. 1). The upstream seals 48, 46 and downstream seals 66 and 68 prevent fluid flow around the seats 70 between the seats and the valve body 18. However, only one upstream and one downstream seal are used for each flow direction.

For example, if the valve is closed then upstream seal 46 prevents fluid flow between the upstream seat and the body 18. If seal 46 fails, is inoperable, or is not installed, then fluid may flow past seal 48, around the upstream seat and around the gate 20 but is sealed off by downstream seal 68. In other words, the U-shaped upstream seal 46 and downstream U-shaped seal 68, which have their open end pointing towards the upstream flow, block fluid flow as indicated by flow arrow 42. The use of two seals provides the benefit of greater sealing ability because of redundancy in the event the upstream seal does not stop fluid flow. In other words, if upstream seal 46 prevents fluid flow around upstream seat 70, then downstream seal 68 is not sealing or not at that moment used to stop the flow of fluid.

Some purchasers of valves prefer to have only bidirectional downstream sealing in the gate valve. In the above example, seals 46 and 66 are then removed so that only downstream sealing is utilized. In that way, when the valve is closed, downstream seal 68 will seal between the downstream seat and body 18 to prevent leakage past the downstream seat. If it were desired to have only bidirectional downstream sealing, then seals 48 and 68 could be used. If for some reason it were desired to have only a single direction of sealing, for example upstream sealing, then all seals except seal 46 might be removed. Thus, the seal configuration can be changed for user preference but for bidirectional redundant sealing all seals are installed.

It will be appreciated that if the fluid flow is reversed, then seal 66 becomes the upstream seal and seal 48 becomes the downstream backup seal around the seats. Therefore, the valve is bidirectional and operates effectively for fluid flow in either direction. Only two seals are operational depending on the direction of fluid flow in throughbore 36. This configuration is optimal for use in varying conditions.

Figure 6:
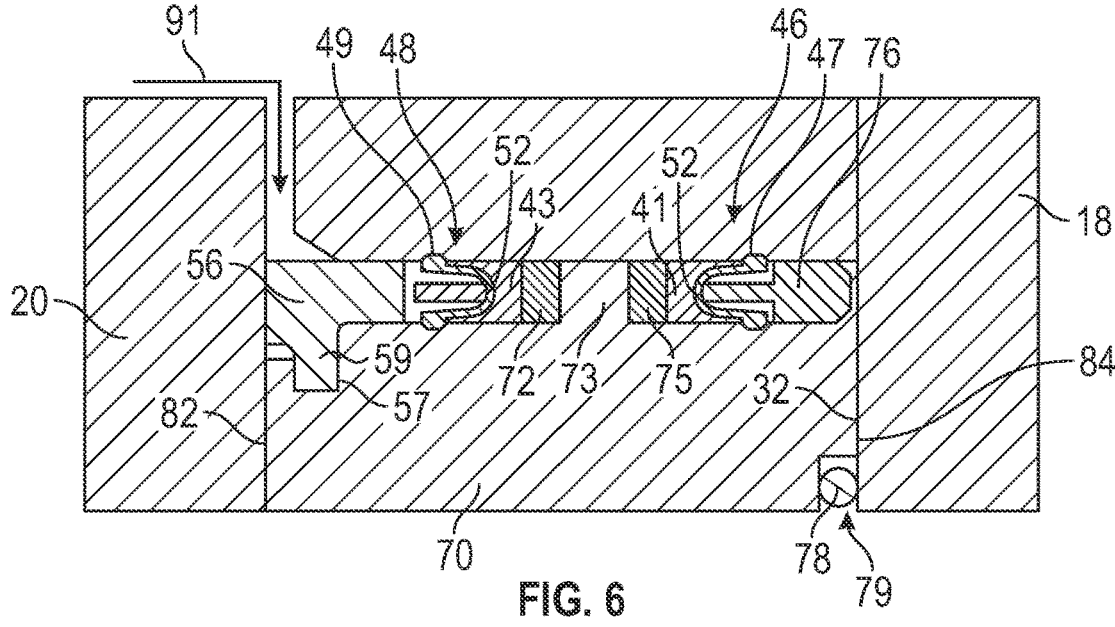
FIG. 6 is a side view of a possible seal assembly on one of the two seats of a gate valve assembly in accord with one embodiment of the present invention.

In FIG. 6 and FIG. 8, the components of the seat seals, 46 and 48 are shown in greater detail. Seat seals 66, 68 are the same construction. Each seat 70 comprises a metal seat body with a plurality of non-elastomeric seal members. In a preferred embodiment, the metal seat body of seat 70 itself is Inconel metal. The seal members comprise PTFE seals with stainless steel springs to energize the downstream seals and PEEK material support and retaining rings for both the upstream and downstream seals. By eliminating elastomeric O-rings, the gate valves will have a longer lifespan with less maintenance requirements while being able to withstand exposure to more extreme conditions. The temperature range of operation is then −50 degrees to 350 degrees F. The seal members are good for all or practically all fluids including corrosive and acidic fluids that will be encountered in the oilfield. Further the seals are good for all pressures up to 20,000 psi. As well, this material lasts a long time. Thus, the problems associated with choosing the correct O-ring for the pressures, fluids, and temperatures to be encountered is eliminated. As well, the problem of replacing seals on a regular basis due to age is eliminated.

Turning again to FIG. 6, an enlarged side view of a seat 70 is shown in accord with one embodiment of the present invention. If fluid attempts to flow behind seat 70 as indicated by arrow 79, then seal 46 prevents the fluid flow. This would be the situation discussed in FIG. 5 with fluid flow in throughbore 36 in the direction indicated at 42.

If fluid flow was in the opposite direction than as shown in FIG. 5, and has leaked through the upstream seal 66, then as indicated by fluid flow arrow 91 towards the seat 70, the fluid is directed towards the seal 48, which seals around the seat.

Figure 7:
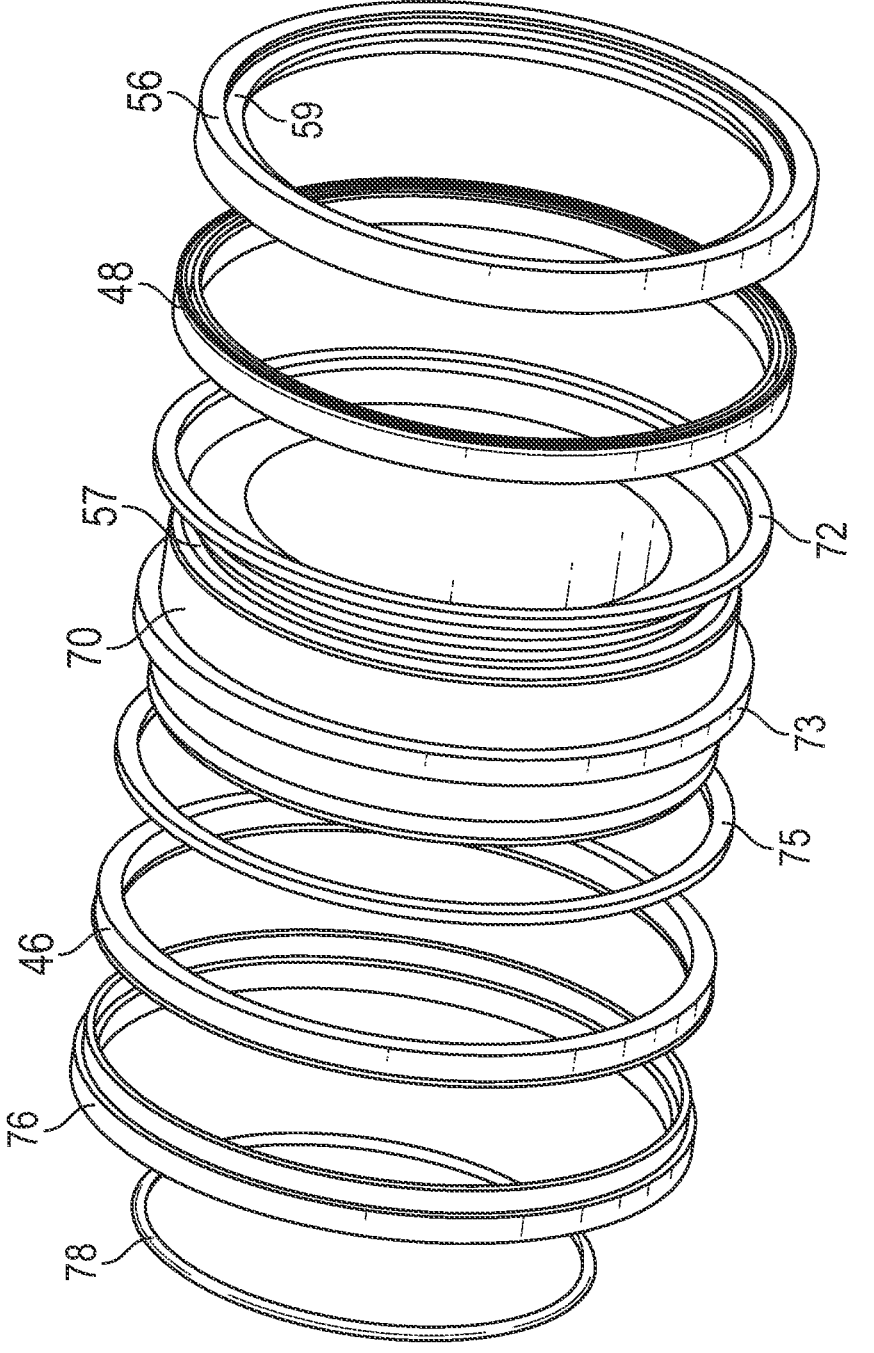
FIG. 7 is an exploded perspective view for one embodiment of a seat with seal assembly for a gate valve in accord with one embodiment of the present invention.

As seen in FIGS. 6-7, the seal assembly of U-shaped seal 48 and support ring 72 used with seat 70 on one side of metal flange 73 is held in place by retainer ring 56. Retainer rings may be non-metallic or non-elastomeric retainer rings. Retainer ring 56 is snapped or pressed into place by inserting leg 59, which extends from retainer ring 56, into slot 57. Retainer ring 56 maintains U-shaped seal 48 and support ring 72 in place against metal flange 73 of seat 70. Support ring 72 also preferably provides an anti-extrusion or non-extrusion function due to being comprised of a harder material than base regions 41 and 43 of U-shaped seals 46 and 48. Support rings may be non-elastomeric. In this embodiment, there is no need for retainer ring 76 to snap into place on the opposite side as retainer ring 56 because the valve body 18 is operable to maintain U-shaped seal 46 and corresponding support ring 75 in place. Support rings 72 and 75 are directly next to metallic flange 73 and between U-shaped seals 46 and 48. Sealing end or surface 82 of seat 70 engages one of the flat sides of gate 20 when the gate is closed to seal throughbore 36. Outer spring 78 at outer end 84 of seat 70 urges seat 70 against gate 20 to form an initial seal. The radial length of outer end 84 is greater than the radial length of sealing end 82 so that pressure between pocket wall 32 and outer end 84 produces a force pushing seat 70 towards gate 20 that keeps the seat firmly against the gate as pressure rises in throughbore 36 when the gate is closed.

As one possible example of operation, fluid flow in the direction of arrow 91 may flow pass retainer ring 56 to U-shaped seal 48 whereby the pressure of the fluid expands U-shaped seal 48 open to block the fluid from traveling beyond the seal. The actual seals 47 and 49 on the ends of leg expansion springs 52 are formed of PTFE as discussed above. Leg expansion springs 52 are utilized to retain the seal in engagement with the metal walls of pocket 32 and in the proper orientation for proper sealing. Springs 52 expand seals 47 and 49 that press against the body 18 within pocket 32 to create an initial seal. Pressure within the U-shaped seal 48 due to pressure in throughbore 36 urges the wings or legs of spring 52 open so that the seal 49 maintain the seal with higher pressures. The higher the pressure in throughbore 36, the greater the force created on seal 49 due to pressure within the U-shaped interior of the seal and thereby increases the openings of the U-shaped interior. Springs 52 may be constructed of a stainless steel or other suitable material.

Outer spring 78 is installed on the opposite side of seat 70 from gate 20 to create initial tension or pressure between the seat and gate 20 thereby creating an initial metal to metal seal between the flat side of gate 20 and the face or sealing end 82 of seat 70.

Turning to FIG. 7, an exploded perspective view of a seat 70 with sealing assembly is shown in accord with one possible embodiment of the present invention. The combination of seat 70 with the corresponding seals may be referred to as a seat assembly. As discussed above, the seat assembly is further comprised of an outer spring 78 that is utilized to press seat 70 against the gate to create an initial tension whereby an initial metal to metal seal is made between the gate surface and the metal surface of seat 70.

In one possible seal ring assembly embodiment, retainer ring 56 may be pressed into place to retain the position of the plurality of other rings and the seat into place against the valve body. Opposite retainer ring 56 is retainer ring 76. Seal rings 48 and 46 are operable to expand to stop fluid from flowing passed. The seals are operable for bidirectional sealing. These seal rings may be comprised of PTFE with stainless steel springs which aid in pressing the seals against the body for greater sealing ability. Polytetrafluoroethylene (PTFE) is a synthetic fluoropolymer of tetrafluoroethylene that has numerous applications. The use of PTFE versus prior art rubber rings allows for a greater range of temperatures, pressures, and conditions to be utilized. These seals may also be referred to as non-elastomeric seals. Non-elastomeric seals provide the advantage of lower maintenance needs and a wider temperature range than elastomers, as well as a wider range of chemical compatibility. Therefore, utilizing non-elastomeric seals will allow an operator to use one set of rings in a much wider variety of applications leading to reduced time in changing out seals, reduced maintenance costs, and increased operational flexibility. Anti-extrusion support rings 72, 75 and retaining rings 56 and 76 may be comprised of PEEK material. PEEK is a semicrystalline thermoplastic with excellent mechanical and chemical resistance properties that are retained to high temperatures.

In FIG. 6, outer retainer rings 56, 76, are used to form outer barriers that contain sealing rings 48, 46 on the seat 70, while in FIG. 8 the seat metal body itself comprises metallic outer barriers or lips that contain the sealing rings on seat 70.

Comparing FIG. 6 to FIG. 8, a different sealing assembly is shown. Fewer sealing rings are required because there is no need for outer seat retainer rings 56, 76 to hold the seat in arrangement with the gate. As can be seen in FIG. 8, retainer ring 56 is omitted using lip 54.

In this embodiment, U-shaped seal rings 46, 48 may be slidingly installed passed lip 54 using a cone shaped tool (not shown). In other words, the cone shaped tool has a smaller diameter onto which the U-shaped seal ring is placed and that smoothly increases in diameter to the diameter of the lip. The U-shaped seal slides along the cone shaped tool until it is compressed sufficiently to slip over the lip, such as metallic lip 54 near the sealing side or metallic lip 55 on the opposite side. If it is attempted to install the U-shaped seal ring without the tool it is very likely that the U-shaped seal will be damaged because the U portion is pressed together hard due to the lip being sized to be at the outer range of circumference that the diameter of the U-shaped seal can be slipped over without damage.

Lip 54 protrudes into the channel or gap to allow the seals to be slid into place while also performing the function of the retaining ring 56 (FIG. 6) which is no longer needed. Additionally, on the opposite end relative lip 54, retaining ring 76 has been omitted. Likewise, lip 55 has been added similar to lip 54 to perform the function of the retaining ring which has been removed in this embodiment. Therefore, fewer parts are required for assembly while retaining the same functionality.

In FIGS. 9A and 9B, perspective views are shown of a gate for a gate valve in accord with one embodiment of the present invention. In one possible embodiment, gate 20 is generally rectangular comprising flat sides 26 and rectangular cross section 40 as discussed previously. Gate 20 has an opening 22 and a blank sealing region 24 which when aligned with the throughbore will either provide sealing or allow the flow of fluid through the throughbore. As discussed above, the seats make a metal-to-metal seal with the blank sealing region 24. When the gate is oriented vertically, T-slot 58 which may also referred to as a stem connector, gate connector, stem-gate connection, or latch 58 may be positioned at the top. The connector 58 may be milled or forged into the gate 20. The connector 58 also has a reciprocal connector on the stem to be inserted into the connector 58. The T-slot 58 may be a non-threaded latch to allow the stem to be slid or pressed into the connection on the gate 20. While a threaded stem gate connection could be utilized, one embodiment instead uses the T-slot 58. This type of connector may provide added strength and rigidity to the gate and connection between the gate and the stem and additionally decreased time may be required to assemble the gate valve. In FIG. 9B, opening 22 is located on a lower portion of gate 20 and blank sealing face 24 is above opening 22, opposite of gate 20 in FIG. 9A. Either arrangement is consistent with the teachings herein.

Figure 10:
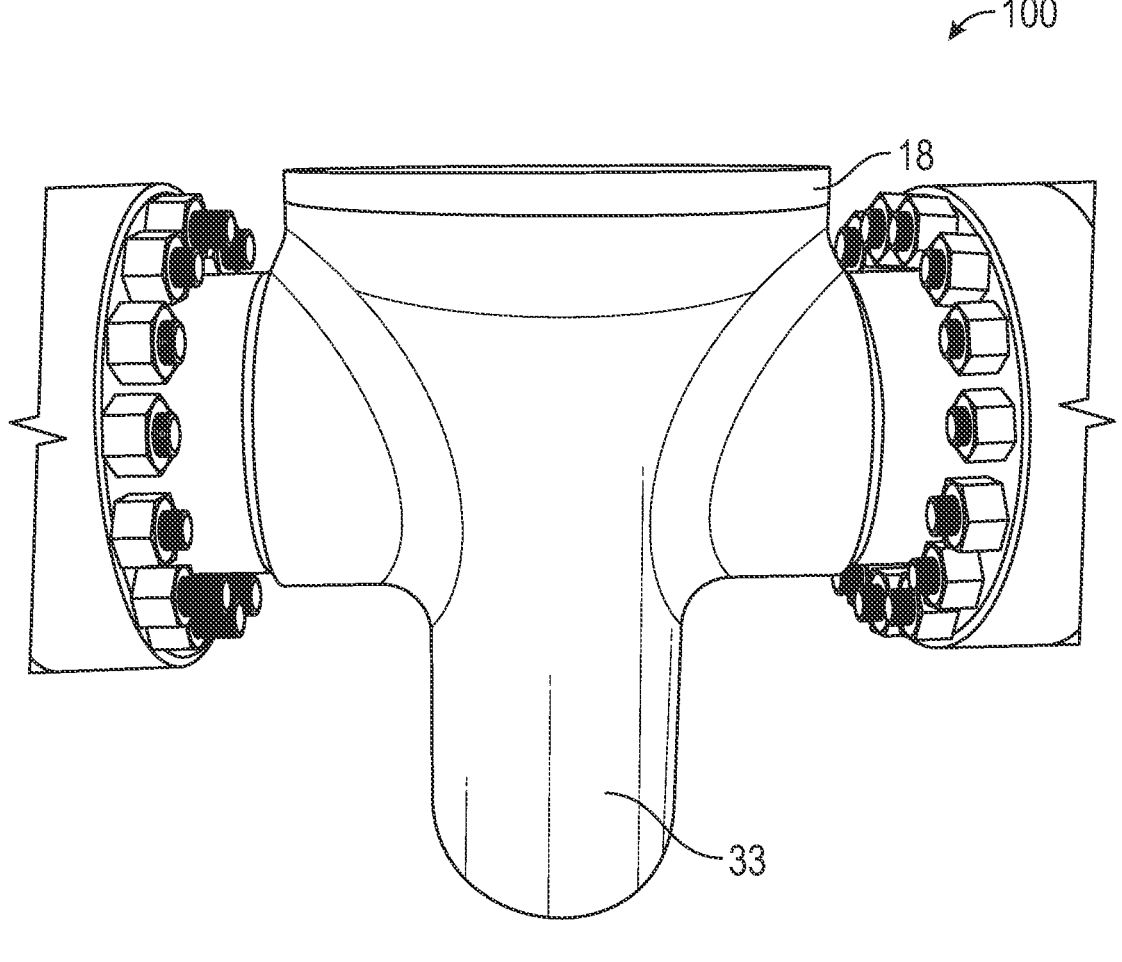
FIG. 10 is a front view of a gate valve comprising an oval lower body with the bonnet removed in accord with one embodiment of the present invention.
Figure 13:
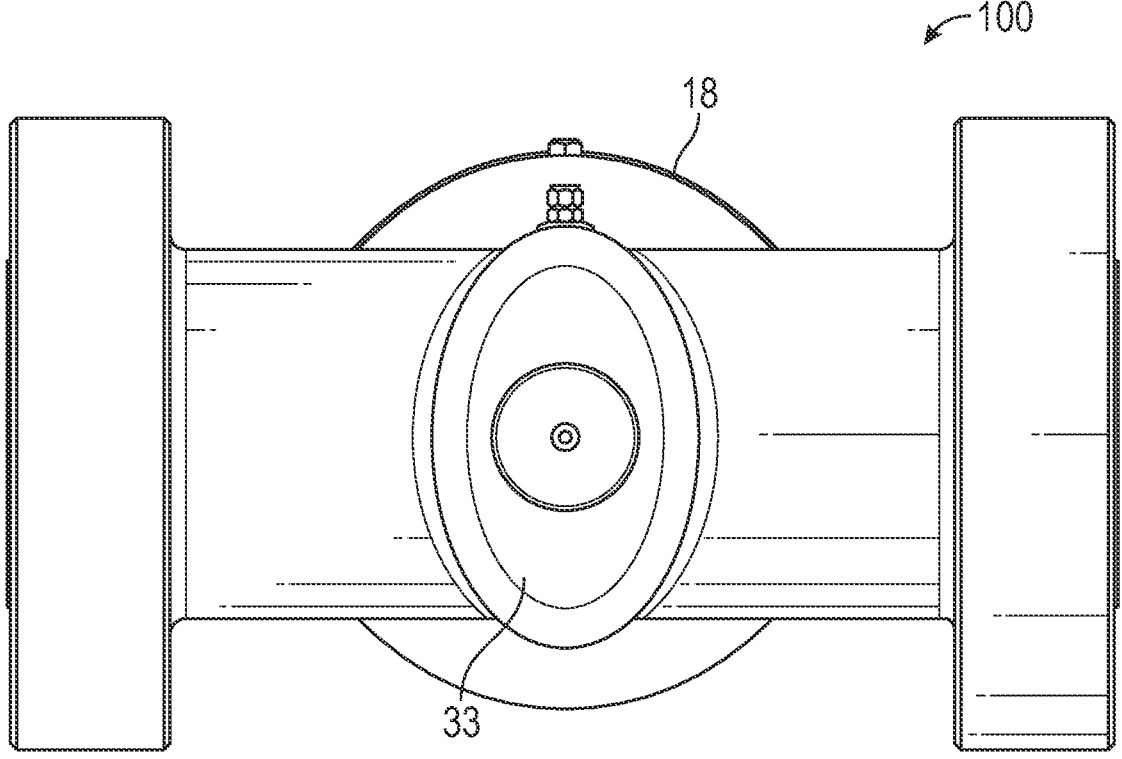
FIG. 13 is a bottom view of an oval or non-circular gate valve body in accord with one embodiment of the present invention.

FIGS. 10 and 13 show gate valve 100 with the bonnet portion removed emphasizing the difference in outer diameter between the upper and lower body portions. The valve body has a non-circular body below the throughbore that substantially reduces the weight of the gate valve. The body cavity has a lower portion which is rectangular shaped below the throughbore and an upper portion that is circular in shape above the throughbore. In other embodiments, the upper portion may be oval or rectangular shaped. The lower portion receives the rectangular gate valve when the gate valve is moved into the open position. As depicted, lower gate body segment 33 is substantially smaller than upper body segment 18. However, the lower body could be round with a round body cavity if desired.

Figure 11:
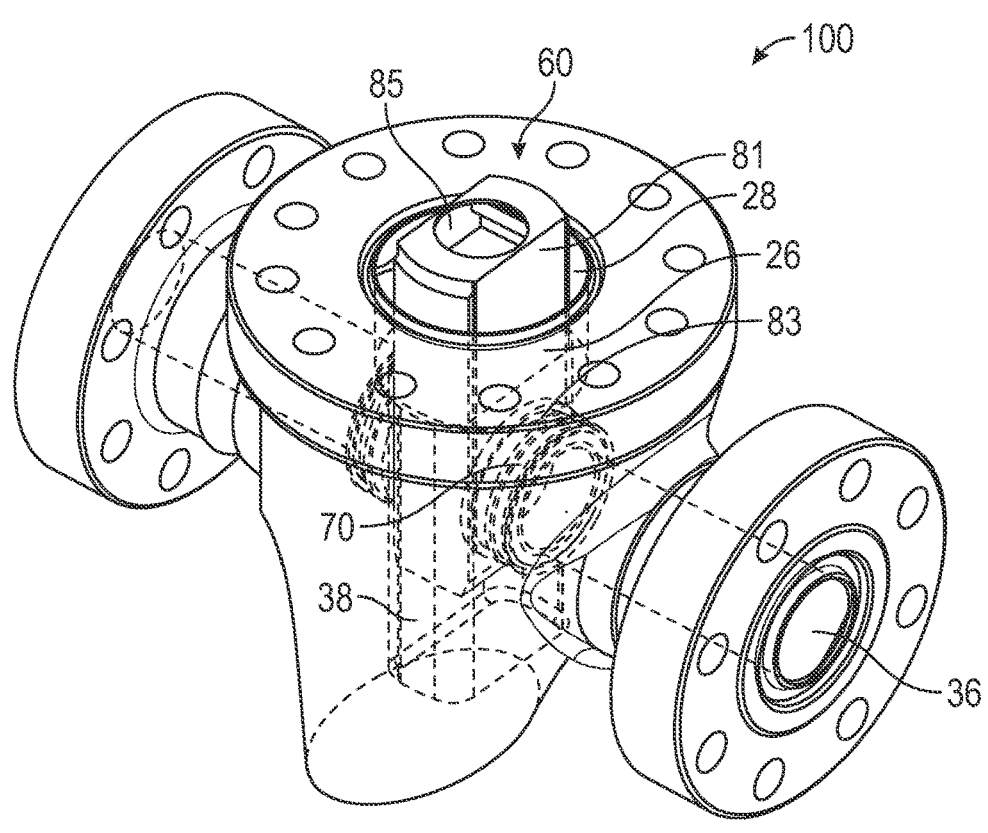
FIG. 11 is a partial sectional perspective view of a skirt assembly inserted into the round and rectangular portions of the body cavity to prevent debris from entering the body cavity when opening and closing the gate for a gate valve in accord with on embodiment of the present invention.
Figure 12:
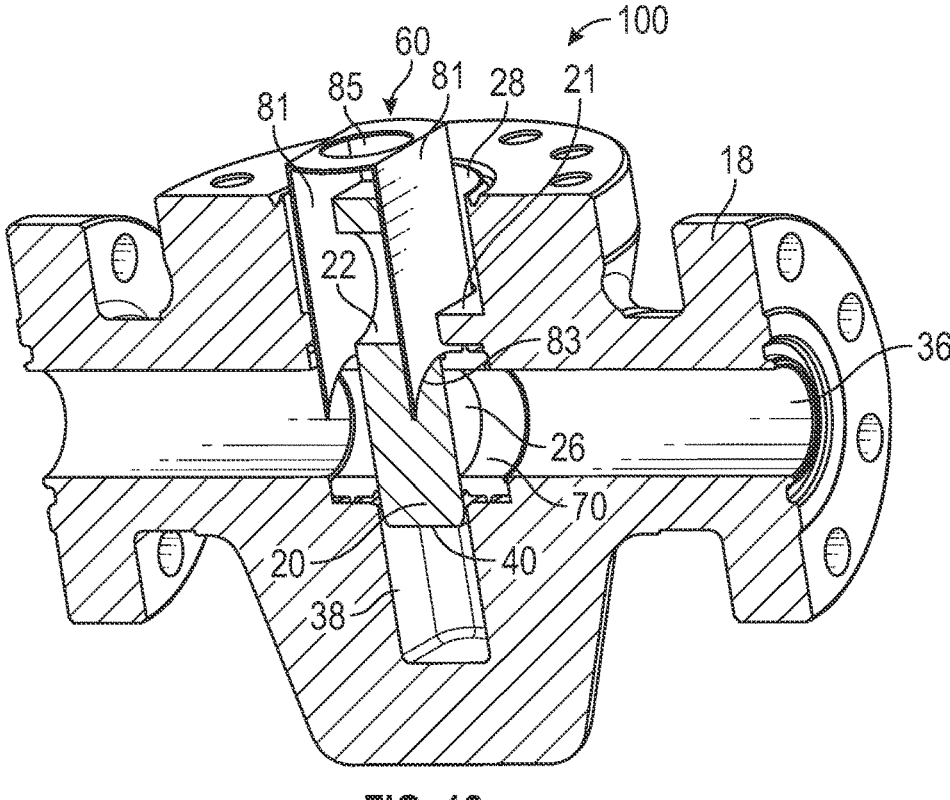
FIG. 12 is a cross-sectional view of the skirt assembly inserted into round and rectangular portions of the body cavity of a gate valve comprising a non-circular lower body in accord with one embodiment of the present invention.

Turning to FIGS. 11-12, various views of a skirt assembly mounted within gate valve 100 are shown in accord with one embodiment of the present invention. Skirt 60 covers the opening 22 of the gate 20 when the gate is closed. In other words, plates 81 of skirt 60 are positioned to limit debris movement from the opening 22 into the body cavity. In this way, skirt 60 prevents dirt, debris, and the like that may be caught in opening 22 during operation from entering the body cavity 16 when the valve is moved to the closed position. This prevents dirt or debris from contaminating the body cavity which may lead to clogging, impairing, or otherwise hampering the operation of the gate valve. Additionally, the use of skirt 60 ensures proper operation and increases operational time while decreasing down time required cleaning and maintaining the gate. However, plates 81 have various features that prevent pressure in gate valve opening to push open the plates as discussed hereinafter.

The multiple surface gate valves used in fracking operations may use a million dollars of grease pumped through the body cavity per fracking operation. The present invention can prevent debris from entering the body cavity without pumping grease therethrough. This potential use of the valve may save up to a million dollars in 2022 dollars per job, thereby giving a huge competitive advantage for use of the present invention in fracking jobs. However, it will be understood that the present can also be utilized in subsea operations. With the seat seals discussed hereinbefore, it will be appreciated that gates purchased by the operator can be used in widely different operations. Because operators do not always know where a valve will be used before purchase, the wide operational use of the present valve results in more reliable well operation and at the same time lower costs due to the need to buy fewer or no specialized valves for different types of operations.

The skirt 60 has plates 81 that are flexible and may bend to some degree and may be spring-like when bent. The plates may be bent during manufacture as shown in FIG. 14C with respect to the top plate to provide more force against the gate when mounted. In other words, each plate may be bent prior to being mounted as shown in FIG. 14C to thereby produce pressure against said gate. In a preferred embodiment, each plate is springingly mounted to the top plate or otherwise springingly mounted in the cavity so that the plates 81 are urged toward the gate. As discussed herein, the gate is slidingly movable with respect to the plates. While the inward extension from the body cavity that forms floor 21 could also be used to support the end of skirt 60, the spacers shown in FIG. 14A-14B may typically be used to provide support due to flexing of plates 81 in response to a pressure differential between the gate opening and the body cavity after the gate is moved to a closed position due to pressure in the throughbore. Thus, plates 81 with spacers may be used with or without the top plate that connects plates 81 together to prevent bending of the plates that may allow debris into the body cavity.

Figure 14A:
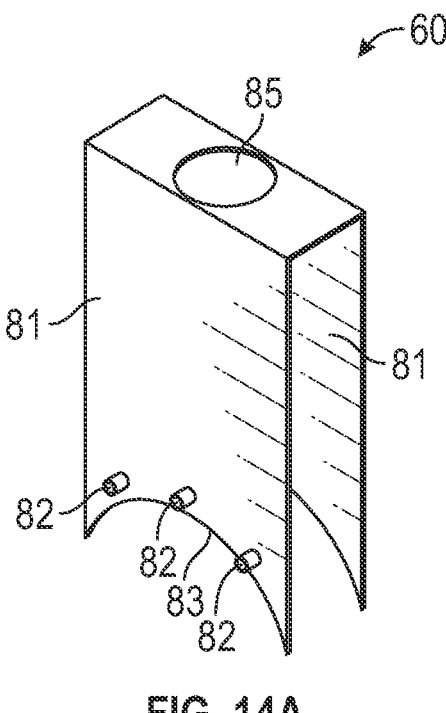
FIG. 14A is a perspective view of a skirt plate comprising standoffs or spacers for a gate valve in accord with one embodiment of the present invention.
Figure 14B:
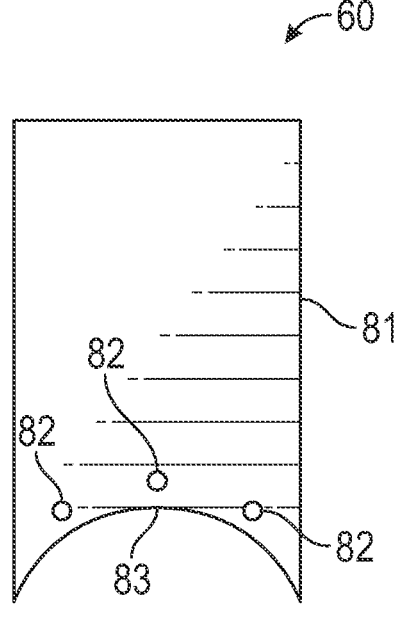
FIG. 14B is a side view of a skirt plate for a gate valve comprising standoffs or spacers in accord with one embodiment of the present invention.
Figure 14C:
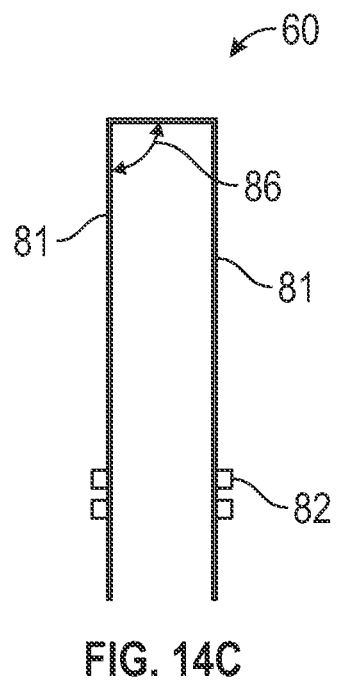
FIG. 14C is an end view of a skirt plate for a gate valve comprising standoffs or spacers in accord with one embodiment of the present invention.
Figure 14D:
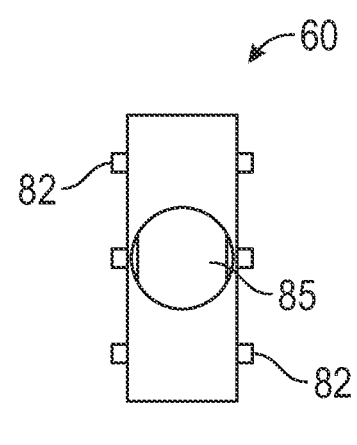
FIG. 14D is a top view of a skirt plate for a gate valve comprising standoffs or spacers in accord with one embodiment of the present invention.

In one possible embodiment, as shown in FIGS. 14A-14B, skirt 60 is constructed of a rectangular frame complementary to the gate 20. Referring back to FIGS. 11-12, skirt 60 is inserted into body cavity 16 and over gate 20 where it is fixed in place with respect to valve body 18. Skirt 60 has two sides or skirt plates 81 that slidingly engage the gate thereby sealing the cavity from contamination. Skirt plates 81 are configured to extend slightly inward at an approximate 89 degree angle as shown in FIG. 14C at angle 86. Skirt plates 81 may flex slightly with respect to the top plate. In this possible embodiment, each said plate is effectively springingly mounted to thereby produce pressure or to be urged towards said gate. If skirt plates were secured at the bottom (not shown), then the inwardly mounted flat surfaces 19 (FIG. 1) could be positioned near the upper ends and/or spacers 82 could be positioned at the top rather than at the bottom of the plates 81.

In this embodiment, skirt 60 comprises two semi-circular recesses 83 to allow close engagement with the seats 70. As shown in FIG. 11, the recesses 83, which may also be referred to in the claims as engagement ends because the semi-circular recesses 83 are preferably engaged with corresponding seats for support. Spacers 82 are arranged equidistant between each other above recesses 83 on skirt plates 81 to better align skirt 60 within valve body 18 during operation. In a preferred embodiment, there are three spacers 82, but more or less spacers may be utilized consistent with the teachings herein. Spacers 82 are cylindrical in shape in this embodiment, although other shapes of the spacers, e.g. rectangular, square, oval or the like, may be used consistent with the teachings herein. The skirt has a circular opening 85 at the top to allow connection of the stem and gate. Skirt 60 may be comprised of metal or other suitable material that is resilient enough to withstand the pressures and temperatures present during well operations.

Skirt 60 surrounds gate 20 to alleviate debris from collecting in the body cavity during movement from the open to the closed position, as well as to alleviate sand and other particles from interfering with the operation of the gate valve and damaging the components.

Figure 15:
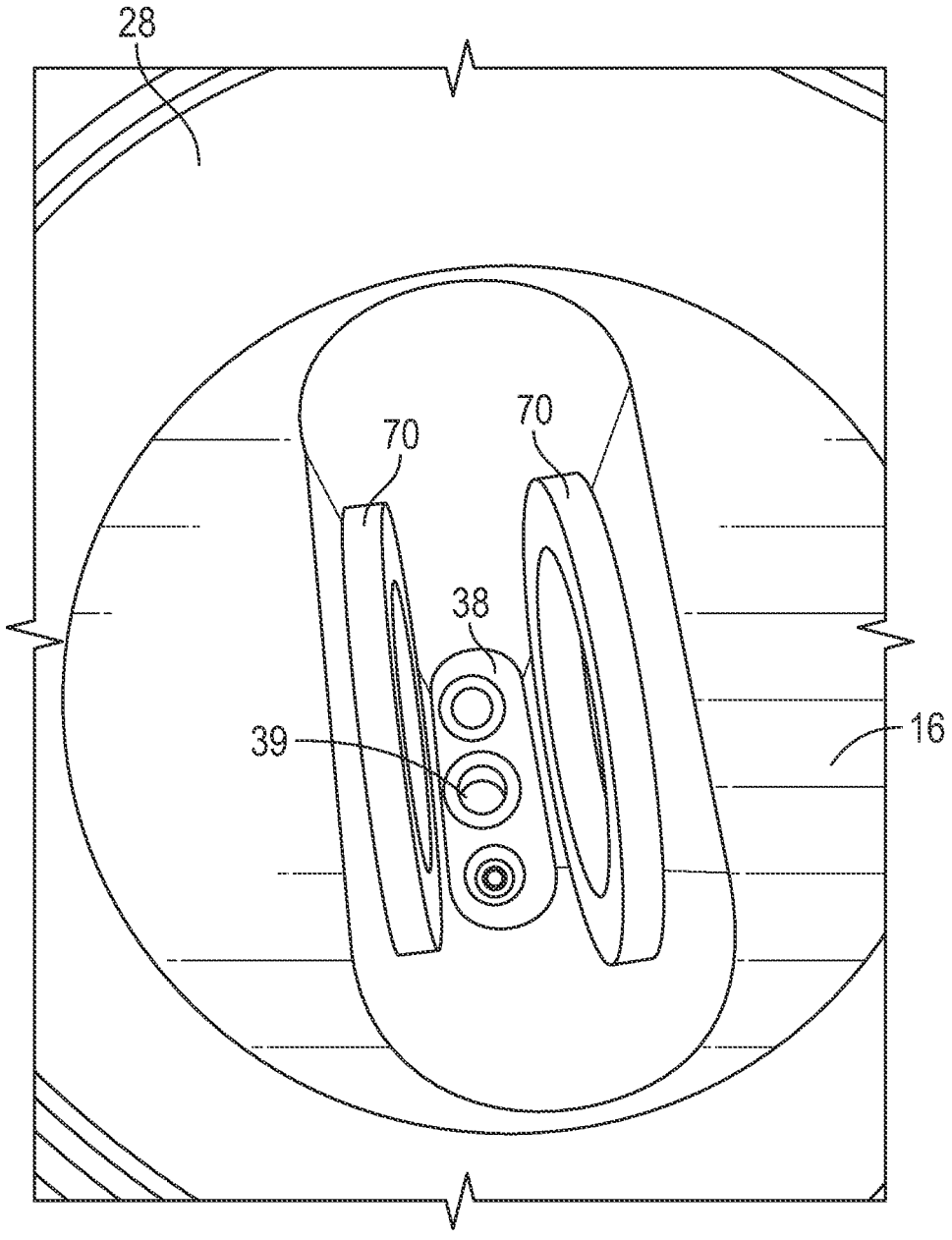
FIG. 15 is a top view of the inner body cavities of a gate valve with round ends and two flat sides that is substantially rectangular in accord with one embodiment of the present invention.
Figure 17:
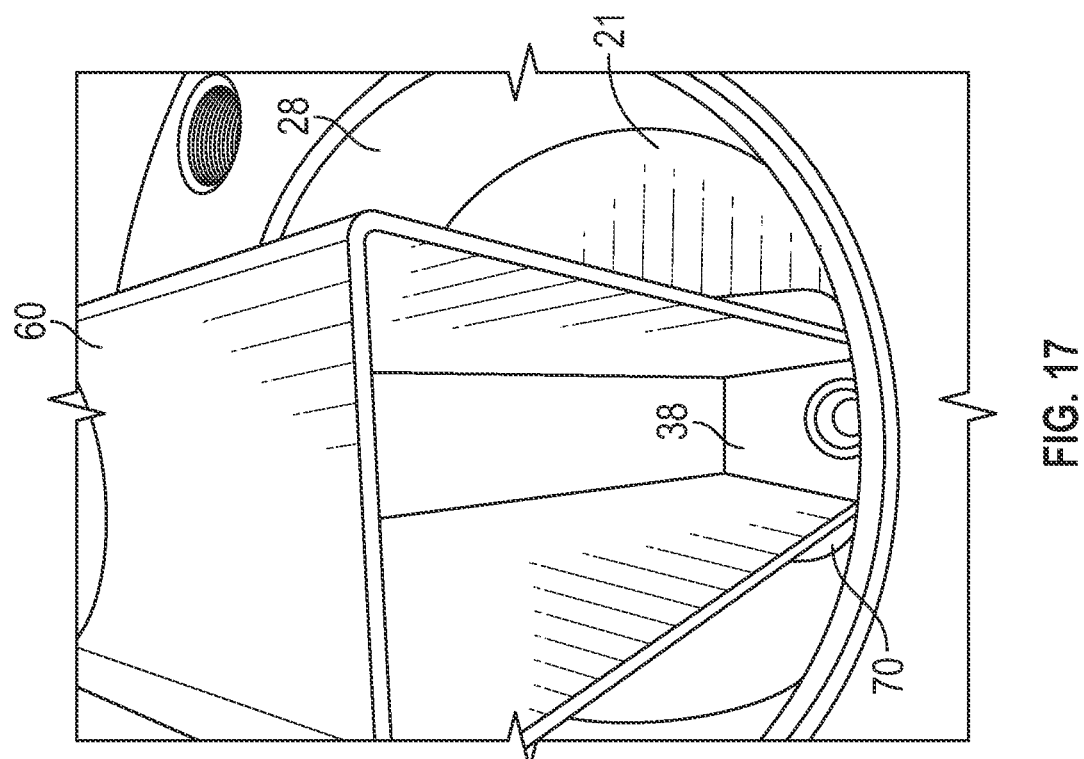
FIG. 17 is a partial sectional perspective view of a skirt assembly inserted into the round and rectangular portions of the body cavity to prevent debris from entering the body cavity when opening and closing the gate for a gate valve in accord with on embodiment of the present invention.
Figure 16:
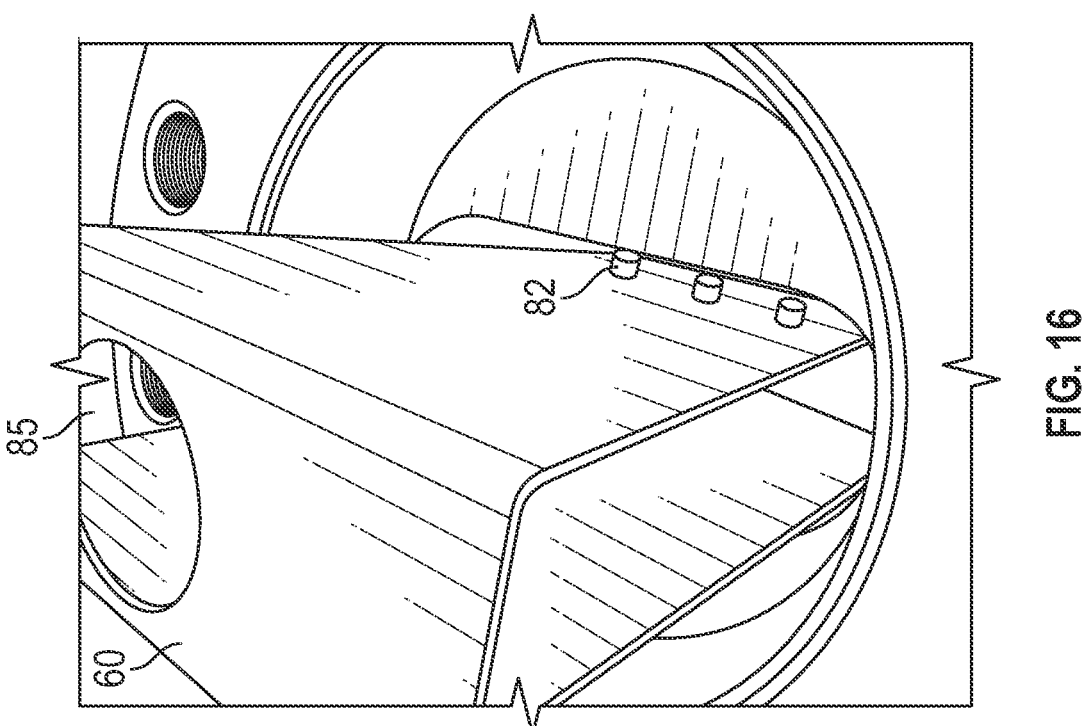
FIG. 16 is a perspective view of a flexible skirt assembly to prevent or limit debris from entering the body cavity comprising spacers that engage two oppositely positioned flat sides of the lower body cavity for a gate valve in accord with one embodiment of the present invention.

In FIGS. 15-17, it can be seen that the two sides 81 of skirt 60 extend through the circular or rounded cavity 28, past floor 21 of rounded cavity 28 and into engagement with the upper body cavity walls 16. Weep holes 39 may be utilized to clear any debris that accumulates in lower body cavity 38. As explained above, when the gate is opened and debris is trapped in the opening 22 of the gate, then sides 81 supported by spaces 82 prevent debris from entering the body cavity. As also discussed above, the body cavity is preferably filled with grease to further prevent debris from entering the body cavity. Grease could also be circulated through the valve to provide additional protection from debris that might damage the valve as is done in the prior art although that has been found to be unnecessary.

Figures 18A, 18B, 18C, 18D:
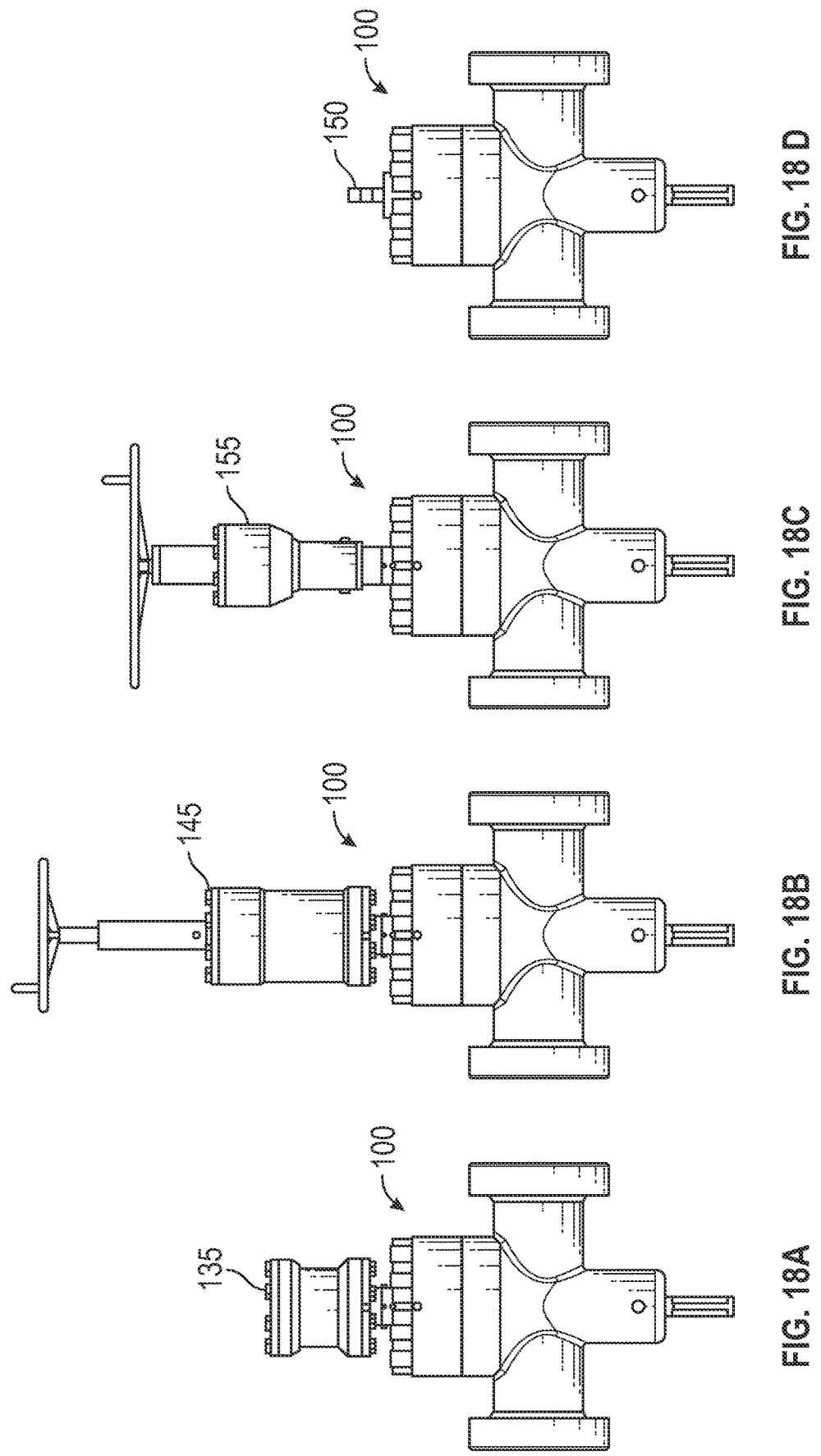
FIG. 18A is a front view of a gate valve with hydraulic operator in accord with one embodiment of the present invention.
FIG. 18B is a front view of a gate valve with a manual and a failsafe operator in accord with one embodiment of the present invention.
FIG. 18C is a front view of a gate valve with manual operator in accord with one embodiment of the present invention.
FIG. 18D is a front view of a gate valve with operator removed that removably accepts either a hydraulic operator, a failsafe operator with another type of operator, or a manual operator in accord with one embodiment of the present invention.

Turning to FIGS. 18A-18D, gate valve 100 is shown with various configurations of operators. The present invention is operable to switch between operators on demand by simply removing the bonnet without requiring changing out the entire gate valve as with the prior art. In FIG. 18A, gate valve 100 is shown with hydraulic operator 135 and FIG. 18B is shown with failsafe operator 145 to provide a hydraulic failsafe mechanism to force the gate into the desired open or closed position. In one embodiment, the failsafe may operate using spring force or other alternative energizing means. FIG. 18C shows gate valve 100 with manual operator 155 for manual operation. The operators connect to gate valve 100 using stem 150 as shown in FIG. 18D. Internal views are shown for example in FIG. 4

When comparing the prior art valves with the present invention, the gate and seats of the improved gate valve assembly are both slimmer, as the body cavity size is decreased overall. This provides advantages of decreased weight and size for a particular throughbore size, operation in a very wide range of temperature, pressure, and fluid. As well there is a limited need for maintenance. Further, the reduced number of parts and much wider range of temperature, pressure, and fluid operation allows the same valve to be used in many different types of applications. This reduces engineering costs required to build each valve for specific applications and even allows the ability to keep a smaller number of valves in stock. This makes delivery of valves for a wide variety of operation much faster.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention. For example, while circular and non-circular cross-sections are discussed in the application for the body cavities it will be appreciated that the valve is not limited to any particular arrangement thereof. For example, both upper and lower body cavities could be round or non-round. As well, while spacers are discussed being mounted to the plates, the features of the circular or noncircular valve body cavities or outer circumference could be present, rearranged, and/or not present. Moreover, the scope of this patent is not limited to its literal terms but instead embraces all equivalents to the claims described.

The invention claimed is:

1. A gate valve, comprising:

a throughbore in said gate valve that extends through said gate valve, said gate valve comprising an upper body segment and a lower body segment;

a body cavity in said gate valve that is oriented transversely to said throughbore;

a gate movable in said body cavity between an open position and a closed position, said body cavity in said gate valve extending from above said throughbore to below said throughbore when said gate valve is upright;

said gate comprising a gate opening that aligns with said throughbore in said open position, said gate further comprising a blank portion that aligns with said throughbore in said closed position;

a plate mounted in said body cavity on each side of said gate so that said gate is moveable with respect to each said plate, each said plate comprising a spacer that extends outwardly from each said plate whereby movement of each plate away from said gate is limited by engagement of said spacer with a wall of said body cavity, each said plate being sized and positioned to cover said gate opening when said gate is moved to said closed position, each said plate being positioned to limit debris movement between said gate opening and said body cavity; and said gate is mounted so that when said gate valve is upright and in the closed position then said gate opening is above said throughbore.

2. The gate valve of claim 1, further comprising when said gate valve is upright then said body cavity above said throughbore comprises a circular cross-section, said body cavity below said throughbore comprises a non-circular cross-section, whereby said non-circular cross-section is sized to slidingly receive said gate.

3. The gate valve of claim 1, further comprising a top plate that connects to each said plate, said top plate further comprising an opening therein.

4. The gate valve of claim 3 further comprising a stem being connected to said gate with a stem-gate connection, said stem being above said throughbore when said gate valve is upright wherein said stem-gate connection comprises a latch without threads, said stem or said stem-gate connection extending through said opening in said top plate.

5. The gate valve of claim 1, further comprising a seat on both sides of said gate, each said seat comprising an opening therethrough and being in surrounding relationship to said throughbore, each said seat comprising a gate engagement end that engages one side of said gate, each said plate being mounted on each side of said gate comprising an end that engages a corresponding seat to support each said plate within said body cavity.

6. The gate valve of claim 1, whereby said gate valve is operable with a hydraulic, failsafe, or manual operator, said hydraulic, failsafe or manual operator being interchangeably mountable to said gate valve by removing a bonnet of said gate valve and without removing said upper body segment.

7. The gate valve of claim 1, whereby an outer circumference of said lower body segment is non-circular.

8. The gate valve of claim 7, wherein said outer circumference of said lower body segment is oval.

9. The gate valve of claim 1, wherein each said plate being springingly mounted within said body cavity to thereby produce pressure against said gate.

10. The gate valve of claim 1, wherein said lower body segment comprises an oval circumference at a lower-most portion thereof.

11. A gate valve, comprising:

a throughbore in said gate valve that extends through said gate valve, said gate valve comprising an upper body segment and a lower body segment below said throughbore when said gate valve is upright, said lower body segment comprising an outer circumference along a length of said lower body segment that is non-circular;

a body cavity in said gate valve that is oriented transversely to said throughbore;

a gate movable in said body cavity between an open position and a closed position, said body cavity in said gate valve extending from above said throughbore to below said throughbore when said gate valve is upright; and said gate comprising a gate opening that aligns with said throughbore in said open position, said gate further comprising a blank portion that aligns with said throughbore in said closed position.

12. The gate valve of claim 11, further comprising when said gate valve is upright then said body cavity above said throughbore comprises a circular cross-section portion, said body cavity below said throughbore comprises a non-circular cross-section portion, whereby said non-circular cross-section portion is sized to slidingly receive said gate.

13. The gate valve of claim 11, further comprising a plate mounted in said body cavity on each side of said gate so that said gate is moveable with respect to each said plate, each said plate comprising a spacer that extends outwardly from each said plate whereby movement of each plate away from said gate is limited by engagement of said spacer with a wall of said body cavity, each said plate being sized and positioned to cover said gate opening when said gate is moved to said closed position, each said plate being positioned to limit debris movement between said gate opening and said body cavity; and said gate is mounted so that when said gate valve is upright and in the closed position then said gate opening is above said throughbore.

14. The gate valve of claim 13, further comprising a seat on both sides of said gate, each said seat comprising an opening therethrough and being in surrounding relationship to said throughbore, each said seat comprising a gate engagement end that engages one side of said gate, each said plate comprising an end that engages a corresponding seat to support each said plate within said body cavity.

15. The gate valve of claim 14, further comprising a stem being connected to said gate with a stem-gate connection, said stem being above said throughbore when said gate valve is upright wherein said stem-gate connection comprises a latch without threads.

16. The gate valve of claim 15, further comprising a top plate that connects to each said plate, said top plate further comprising an opening therein, said stem or said stem-gate connection extending through said opening in said top plate.

17. The gate valve of claim 11, wherein said outer circumference of a lowermost portion of said lower body segment is oval.

18. A gate valve, comprising:

a throughbore in said gate valve that extends through said gate valve, said gate valve comprising an upper body segment and a lower body segment;

a body cavity in said gate valve that is oriented transversely to said throughbore;

a gate movable in said body cavity between an open position and a closed position, said body cavity in said gate valve extending from above said throughbore to below said throughbore when said gate valve is upright, said gate comprising two sealing sides and a gate width between said two sealing sides;

seats positioned in a pocket on either side of said gate, said seats comprising a seat width extending between a seat pocket end to a seat engagement end, said seat width being smaller than said gate width;

metal-to-metal seals between said gate and said seat engagement end that are operable to prevent leakage between said gate and said seats;

said gate comprising a gate opening that aligns with said throughbore in said open position, said gate further comprising a blank portion that aligns with said throughbore in said closed position; and when said gate valve is upright then said body cavity above said throughbore comprises a round cross-section, a majority of a length of said body cavity below said throughbore comprises a substantially rectangular cross-section, whereby said substantially rectangular cross-section is sized to slidingly receive said gate.

19. The gate valve of claim 18, further comprising a plate mounted in said body cavity on each side of said gate so that said gate is moveable with respect to each said plate, each said plate comprising a plurality of spacers that extend from each said plate to be engageable with a wall of said body cavity, each said plate being sized and positioned to cover said gate opening when said gate is moved to said closed position, each said plate being positioned to limit debris movement between said gate opening and said body cavity; and said gate is mounted so that when said gate valve is upright and in the closed position then said gate opening is above said throughbore.

20. The gate valve of claim 19, further comprising a seat on both sides of said gate, each said seat comprising an opening therethrough and being in surrounding relationship to said throughbore.

21. The gate valve of claim 20, further comprising a stem being connected to said gate with a stem-gate connection, said stem being above said throughbore when said gate valve is upright wherein said stem-gate connection comprises a latch without threads.

22. The gate valve of claim 21, further comprising a top plate that connects to each said plate, said top plate further comprising an opening therein, said stem or said stem-gate connection extending through said opening in said top plate.

23. The gate valve of claim 18, further comprising an outer circumference of said lower body segment is non-circular.

24. The gate valve of claim 23, wherein said outer circumference of said lower body segment is oval.

25. A gate valve, comprising:

a throughbore in said gate valve that extends through said gate valve, said gate valve comprising an upper body segment and a lower body segment;

a body cavity in said gate valve that is oriented transversely to said throughbore;

a gate movable in said body cavity between an open position and a closed position, said body cavity in said gate valve extending from above said throughbore to below said throughbore when said gate valve is upright;

said gate comprising a gate opening that aligns with said throughbore in said open position, said gate further comprising a blank portion that aligns with said throughbore in said closed position;

a plate mounted in said body cavity on each side of said gate so that said gate is moveable with respect to each said plate, each said plate being bent prior to being mounted to thereby produce pressure against said gate, each said plate being sized and positioned to cover said gate opening when said gate is moved to said closed position, each said plate being positioned to limit debris movement between said gate opening and said body cavity; and said gate is mounted so that when said gate valve is upright and in the closed position then said gate opening is above said throughbore.

26. A gate valve, comprising:

a throughbore in said gate valve that extends through said gate valve, said gate valve comprising an upper body segment and a lower body segment;

a body cavity in said gate valve that is oriented transversely to said throughbore;

a gate movable in said body cavity between an open position and a closed position, said body cavity in said gate valve extending from above said throughbore to below said throughbore when said gate valve is upright;

said gate comprising a gate opening that aligns with said throughbore in said open position, said gate further comprising a blank portion that aligns with said throughbore in said closed position;

a plate mounted in said body cavity on each side of said gate so that said gate is moveable with respect to each said plate, each said plate being springingly mounted to thereby produce pressure against said gate, each said plate being sized and positioned to cover said gate opening when said gate is moved to said closed position, each said plate being positioned to limit debris movement between said gate opening and said body cavity; and said gate is mounted so that when said gate valve is upright and in the closed position then said gate opening is above said throughbore.

27. A gate valve, comprising:

a throughbore that extends through said gate valve;

a body cavity in said gate valve that is oriented transversely to said throughbore;

a gate movable in said body cavity between an open position and a closed position;

said gate comprising a gate opening that aligns with said throughbore in said open position, said gate further comprising a blank portion that aligns with said throughbore in said closed position; and a skirt assembly comprising:

a first plate being mounted slidingly adjacent to said gate, said first plate covering said gate opening when said gate is closed; and at least one spacer interposed between said first plate and an interior surface in said body cavity, whereby movement of said first plate away from said gate is limited by engagement with said at least one spacer.

28. The gate valve of claim 27, further comprising a second plate mounted on an opposite side of said gate from said first plate, said second plate also covering said gate opening when said gate is closed, wherein said at least one spacer comprises a plurality of spacers mounted to said first plate and said second plate.

* * * * *